(12) United States Patent
Friedmann et al.

(10) Patent No.: US 6,358,181 B1
(45) Date of Patent: Mar. 19, 2002

(54) MOTOR VEHICLE WITH A CONTINUOUSLY VARIABLE TRANSMISSION AND METHOD OF OPERATING THE MOTOR VEHICLE

(75) Inventors: Oswald Friedmann, Lichtenau; Urban Panther, Seelbach, both of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/465,649

(22) Filed: Dec. 16, 1999

(30) Foreign Application Priority Data

Dec. 16, 1998 (DE) ............................................. 198 58 042
Sep. 15, 1999 (DE) ............................................. 199 44 119

(51) Int. Cl.⁷ ............................................. B60K 41/12
(52) U.S. Cl. ........................... 477/37; 477/45; 477/46; 477/50
(58) Field of Search ........................ 477/37, 45, 46, 477/50

(56) References Cited

U.S. PATENT DOCUMENTS

| | | | | |
|---|---|---|---|---|
| 3,600,961 A | * | 8/1971 | Rattunde et al. | 477/46 |
| 4,369,675 A | * | 1/1983 | van Deursen | 477/46 |
| 4,858,497 A | * | 8/1989 | Kouno | 477/45 |
| 4,942,786 A | * | 7/1990 | Dittrich | 477/46 |
| 4,999,774 A | * | 3/1991 | Tokoro et al. | 477/46 |
| 5,665,022 A | * | 9/1997 | Niiyama | 477/46 |
| 6,077,187 A | * | 6/2000 | Suzuki et al. | 477/46 |
| 6,174,261 B1 | * | 1/2001 | Watanabe et al. | 477/46 |
| 6,226,583 B1 | * | 5/2001 | Iwata | 477/45 |

FOREIGN PATENT DOCUMENTS

DE   195 46 293   6/1996

* cited by examiner

Primary Examiner—Sherry Estremsky
(74) Attorney, Agent, or Firm—Darby & Darby

(57) ABSTRACT

A motor vehicle has a continuously variable transmission and a hydraulic device to perform the functions of changing as well as maintaining the ratio of the continuously variable transmission. The hydraulic device comprises a valve arrangement with at least one connector terminal for controlling a transmission ratio change and at least one connector terminal for maintaining the transmission ratio at a set level.

77 Claims, 10 Drawing Sheets

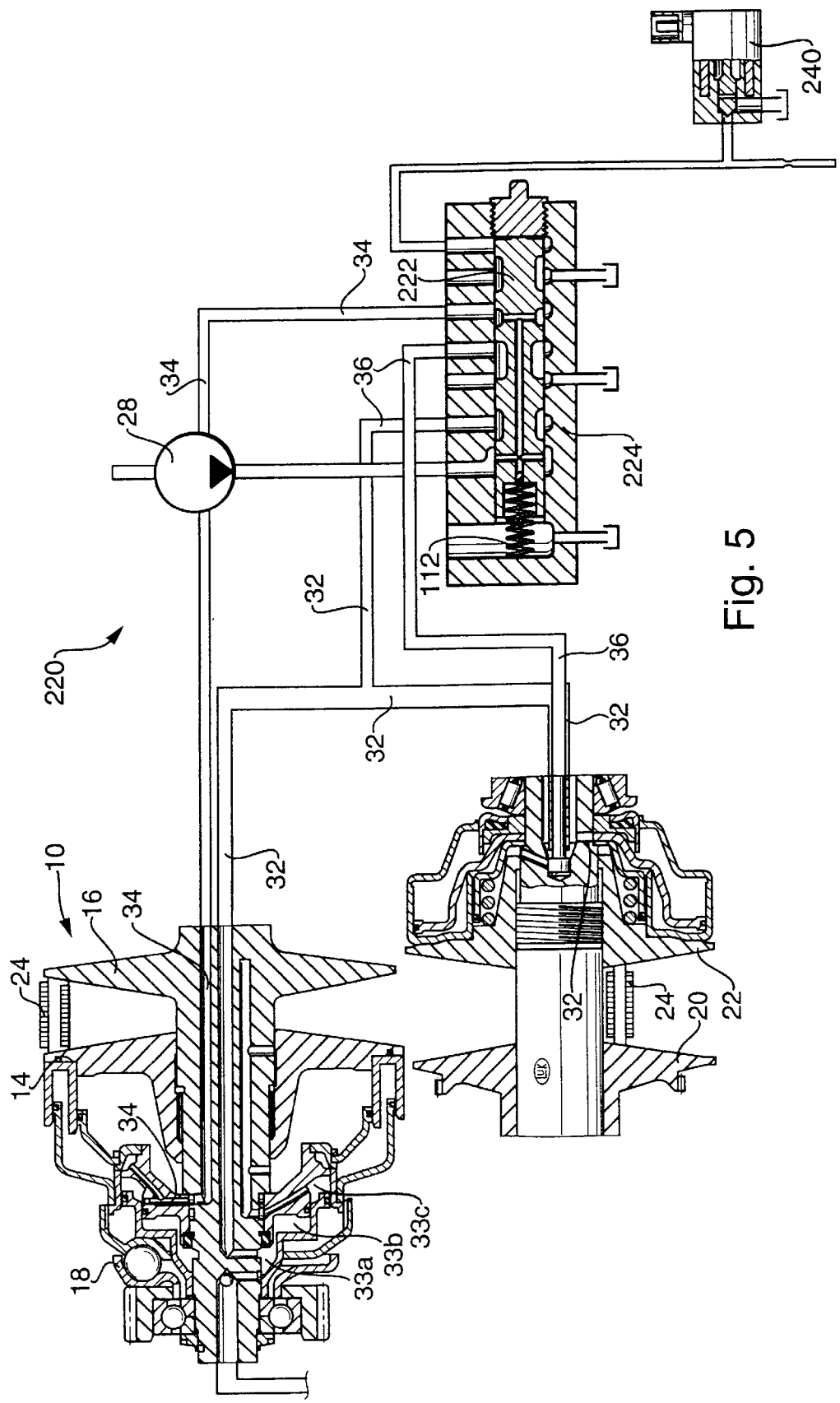

MOTOR VEHICLE WITH A CONTINUOUSLY VARIABLE TRANSMISSION AND METHOD OF OPERATING THE MOTOR VEHICLE

BACKGROUND OF THE INVENTION

The invention relates to a motor vehicle, in particular a motor vehicle with a continuously variable transmission, as well as a method of operating the motor vehicle.

Motor vehicles, including those with a continuously variable transmission, belong to the known state of the art.

From DE 195 46 293 A1, a continuously variable transmission is known that has two pairs of conical disks, each pair comprising a fixed conical disk and, arranged to face the latter, a movable conical disk. A torque is transmitted from one pair of conical disks to the other by means of a chain. Corresponding to the position of the movable conical disks in their respective pairs, different transmission ratios can be set in a continuous range without steps. To hold the position of the chain at a given transmission ratio, or to change the transmission ratio, there is an arrangement of two valve devices connected to the transmission through hydraulic conduits. A first valve device, the ratio-control valve, has seven connector terminals, three of which lead to an oil sump. Connected to a further terminal is a pressure-supply conduit. The pressure that exists in the latter conduit is also communicated to a connector terminal of the second valve device, which has five terminals. The first valve device is controlled by applying to one of the faces of a piston guided inside a cylinder an amount of pressure that is adjustable by means of a proportional valve. Each of two further connector terminals of the ratio-control valve leads to a respective pressure chamber, where one of the two pressure chambers is arranged at the first disk pair and the other is arranged at the second disk pair. From the two further connector terminals, a return conduit branches off towards the second valve device. A connector terminal that is arranged at the axially directed end surface of the second valve device communicates with a pressure supply conduit. Further connected to the second valve device is a conduit that divides into branches outside of the valve device, one branch leading to the first disk pair and one branch leading to the second disk pair for maintaining a previously set level of the transmission ratio.

Each of the two valve devices comprises one pretensioning spring. The spring of the second valve device, in particular, has the function of increasing the pressure that is returned from the first valve device by an amount corresponding to the spring force, so that the pressure in the pressure supply conduit is always increased by an amount corresponding to the spring force. This assures that the pressure in the pressure supply conduit is always sufficient for changing the positions of the disk pairs.

The motor vehicle of the foregoing description, which has a continuously variable transmission that is controllable through a hydraulic system, has been practically proven. The pressure return, particularly with the addition of the spring, as well as the comparator device that constantly compares the comparative pressures supplied to the disk pairs, ensure that the pressure in the supply conduit, i.e., on the side of the pressure source, can always be relied on to be sufficient for controlling the transmission.

Nevertheless, there is a desire for improvements, particularly with respect to the space required by the hydraulic valve devices. Also, a more cost-effective design configuration based on a smaller number of individual components would be desirable.

OBJECT OF THE INVENTION

Therefore, the present invention has the object of providing a motor vehicle with a continuously variable transmission as well as a method of operating the motor vehicle whereby the amount of space required for the controls of a continuously variable transmission is reduced, the manufacturing cost of the motor vehicle is lowered, and assembly times are shortened, while at the same time a high level of operating safety and an uncomplicated design configuration are achieved.

SUMMARY OF THE INVENTION

In accordance with the invention, the foregoing objective is met by providing a motor vehicle with at least one continuously variable transmission and at least one hydraulic device for controlling a transmission ratio change and for holding a set transmission ratio at a fixed level. The term "holding a set transmission ratio at a fixed level" means in particular that an unintentional change of the transmission ratio, which may be inherent in the design or associated with a static or dynamic behavior of the transmission, is prevented. In accordance with the invention, the hydraulic device in particular comprises a valve device with at least one connector terminal for a hydraulic conduit by which the transmission ratio can be changed within a continuous range, i.e., without steps. In particular, this means that a transmission ratio change is effected by an overpressure, an underpressure, or a pressure-free condition in a hydraulic line connected to a terminal of the valve device. As a particular feature of the invention, a valve is provided for switching from the state of holding to the state of changing the transmission ratio. The terminals at the transmission-oriented side of the valve can be or are connected to conduits for supplying the respective amounts of pressure required for changing or maintaining the transmission ratio.

In comparison to the arrangement proposed in DE 195 46 293 A1, the inventive concept of providing a single valve device offers the advantage of a space-saving configuration of the hydraulic controls of a transmission. In addition, the invention saves several components such as, e.g., valve cylinders, valve pistons, or connecting conduits between valves. Furthermore, the invention increases the operational safety of a control device for a motor vehicle transmission and thus of the motor vehicle itself.

The objective of the invention is met further by equipping a motor vehicle with at least one continuously variable transmission comprising at least two pairs of conical disks for receiving an endless flexible torque-transmitting device. At least one of the conical disk pairs includes two elements that are movable in relation to each other in the axial direction, particularly the two conical disks themselves. For example, one conical disk may have a fixed attachment or other fixed relation to a shaft or similar element while the second conical disk may, e.g., have a movable seat on the shaft. By changing the axial distance of the two conical disks, a location where the mutually facing surfaces of two conical disks have a given distance from each other will be caused to move radially in or out to a corresponding extent. The given distance is occupied in particular by an endless flexible torque-transmitting device of a defined width. As a result, the radial distance of the endless flexible torque-transmitting device from the central axis of the conical disk pair is selectable, preferably at each of the conical disk pairs.

At least one, preferably two, and with particular preference all of the conical disk pairs are provided with means for applying hydraulic pressure to at least one side. This application of hydraulic pressure can, e.g., ensure that a currently existing transmission ratio is being held at a fixed level, unless at the particular instant the control device is directing a change of the transmission ratio. The control can, e.g., function in such a way that essentially one and the same pressure is applied to both conical disk pairs. However, the same function of maintaining the transmission ratio can also be realized by applying different amounts of pressure to the conical disk pairs, if the holding pressure at the respective conical disk pair depends on an operating parameter such as, e.g., the transmission ratio.

In accordance with a first preferred embodiment of the invention, a pressure differential between the conical disk pairs can be generated by arranging a throttle valve in a connecting conduit between pressure chambers of which at least one is located at a first conical disk pair and at least one other is located at a second conical disk pair.

In accordance with a further preferred embodiment of the invention the same kind of pressure differential between the conical disk pairs can be achieved through an arrangement where the pressure chambers at the conical disk pairs are connected by a hydraulic line that contains the same amount of pressure throughout and where the required offset pressure is provided by a second, additional pressure supply.

The preferred arrangement of changing or maintaining the transmission ratio is by way of a dual-piston principle. As a particular characteristic of this arrangement, a first chamber located at a first conical disk pair is connected to a second chamber at a second conical disk pair by a hydraulic line. An essentially constant pressure is supplied to the hydraulic line, providing at least a base amount of pressure for the maintaining function. A preferred configuration comprises an essentially parallel and/or serial arrangement with, in particular, a third chamber acting on the first conical disk pair and a fourth chamber acting on the second conical disk pair. The preferred arrangement for the fist and third chambers and also for the second and fourth chambers is such that, with a base pressure being supplied by the first and third chambers, the change of the transmission ratio occurs through the second and fourth chambers. It is particularly preferred if the second and fourth chambers provide a certain pressure differential, which is superimposed on the constant and equal pressure level of the first and third chambers.

According to the invention it is particularly preferred that the lines that supply hydraulic pressure to the conical disk pairs, particularly for maintaining or changing a transmission ratio, lead into the same valve device. It is also possible for the aforementioned hydraulic lines to contain valve devices. However, it is particularly preferred, if essentially no valve devices are arranged in these hydraulic lines. Particularly preferred is a valve device that can be characterized as a piston-cylinder valve device with a single valve cylinder.

The objective of the invention is met further by equipping a motor vehicle with a continuously variable transmission and, adjacent to the latter, at least one hydraulic device for the control of the transmission. The term "control" encompasses the two particular meanings of, respectively, maintaining a set transmission ratio at a fixed level and of changing a transmission ratio from one level to another. Preferably, the hydraulic device comprises at least one pump and at least one valve device for controlling the transmission, the valve device being arranged between the pump and the transmission. In accordance with the invention, the hydraulic control lines that lead into the transmission and, at least part of the time, contain an overpressure supplied by the pump are connected, particularly through a direct serial connection, to the same valve device. A valve device in this context means a piston-cylinder device comprising preferably a single and, in particular, continuous cylinder.

Particularly preferred is a motor vehicle with at least one continuously variable transmission that is controllable by means of a hydraulic device, the latter operating in accordance with the dual-piston principle. The inventive concept provides that all hydraulic control signals for controlling the transmission originate from the same valve device.

Further preferred is a motor vehicle with a continuously variable transmission controlled by at least one hydraulic device, the latter comprising at least a pump and a valve device for controlling the transmission. The arrangement is configured according to a dual-piston principle. The inventive concept provides for the transmission to have two conical disk pairs, each of which has one fixed and one movably mounted conical disk. The two movable conical disks are energized by a first and second hydraulic chamber, respectively, so that an endless flexible torque-transmitting device such as, e.g., a chain essentially maintains its spatial relationship to the conical disk pairs and, as a result, the transmission ratio remains essentially constant. A third and fourth hydraulic chamber arranged, respectively, at the first and second conical disk pair allow, e.g., an additional amount of pressure to be applied to one of the conical disk pairs or, more specifically, to one of the movably mounted conical disks. For example, the additional amount of pressure can be applied for the purpose of holding the conical disk in the case where the first and second chambers are to be held under a constant pressure, but the magnitude of the constant pressure is insufficient for maintaining the transmission ratio at its level. Further, as an example, it is possible to change the transmission ratio through the third and fourth chambers. For example, pressurizing the third chamber may change the transmission in one direction while pressurizing the fourth chamber may serve to change the transmission in the opposite direction. Preferably in this arrangement, the non-pressurized chamber is set into a pressure-free condition. Particularly preferred is an arrangement where all of the aforementioned functions are controlled by a single valve device. Preferably, the valve device receives a control signal, e.g., a hydraulic signal, but not excluding electrical or magnetic control signals as other preferred possibilities.

Thus, the invention particularly allows the respective functions of changing and maintaining a transmission ratio to be performed by a single valve device that is arranged ahead—with preference immediately ahead—of the transmission. As a particular advantage of the invention, an arrangement of valves located immediately ahead of the transmission for the hydraulic control of the latter can be combined into a single valve. This saves, e.g., a second valve that is proposed in known prior-art arrangements. Consequently, it becomes unnecessary to provide a pressure return between two valve devices to ensure that the pressure level is always sufficient for changing the transmission ratio.

A particularly preferred motor vehicle according to the invention has a continuously variable transmission as well as an endless flexible torque-transmitting device for transmitting torque between different components of the transmission, particularly between at least two conical disk pairs. To control the transmission, the inventive concept particularly includes a hydraulic device with a valve device that has at least two connector terminals, preferably three connector terminals. The inventive concept provides for at least one, and preferably only one, of these connector terminals to supply pressure, at least part of the time, for holding the endless flexible torque-transmitting device in place. The inventive concept further provides for at least one, preferably at least two, but with particular preference exactly two of the connector terminals to supply pressure, at least part of the time, for changing the ratio of the transmission.

A preferred motor vehicle has a continuously variable transmission. An endless flexible torque-transmitting device, particularly in the form of a chain, serves for transmitting torque between different components of the transmission. The transmission components are, in particular, at least two pairs of conical disks. Through a hydraulic device comprising at least two, but preferably three, connector terminals, it is possible to apply pressure to the transmission, i.e., particularly to the conical disk pairs, through an arrangement where the amounts of pressure are cumulative at least part of the time, so that the sum of the pressures is applied to the respective conical disk or disk pair or to the transmission in general. The at least two, but preferably three, connector terminals have the particular purpose of receiving hydraulic lines for supplying pressure to the transmission. The hydraulic lines transmit pressure to hydraulic chambers. The introduction of pressure into the chambers is configured so that in two places, particularly at the two conical disk pairs, at least two pressures—occurring particularly in two different chambers—act at least part of the time in an additive mode as a "summation pressure".

This permits, e.g., to hold the pressure in the system at a relatively low level.

In accordance with a particularly preferred embodiment of the invention, a motor vehicle is provided with at least one continuously variable transmission as well as a hydraulic device for controlling the transmission. The hydraulic device comprises at least one valve device with a piston device as well as a cylinder device. In particular, the piston device and the cylinder device, in at least one position in relation to each other, form a chamber that contains an essentially uniform pressure. The chamber is delimited by surface areas which, at least in part, have projected images in a plane that faces in the direction of the piston displacement path. A part of the surface areas with this property belong to the piston device, and a further differentiation is possible between surface areas where an applied pressure will cause the piston to move one way and surface areas where an applied pressure will cause the piston to move the opposite way. Furthermore, the so differentiated surface areas are of different size.

In accordance with a further preferred embodiment of the invention, a motor vehicle is provided with a continuously variable transmission. For the control of the transmission, i.e., particularly for maintaining or changing a set transmission ratio, the motor vehicle is provided with a hydraulic device that comprises a valve device in a serial operating arrangement.

The valve device comprises less than 12 connector terminals, with an increasing degree of preference for numbers of less than 11, 10 or 9, and particularly less than 8, 6, or 5, also with particular preference for numbers between 10 and 5, especially between 9 and 6, and a particularly high degree of preference for exactly 8 connector terminals.

In the context of the invention, the particular meaning of the term "serial operating arrangement" of the valve device is that between the pump and the transmission there is an area of the hydraulic system comprising in principle an arbitrary number of hydraulic connecting lines, all of which terminate at the same valve device and, in particular, that in the flow path between the pump and the transmission, there is no hydraulic line that bypasses the one valve device in parallel so that it would lie in the flow path between the pump and the transmission without being connected to the valve device.

A particularly preferred embodiment of the invention comprises provisions whereby in a valve device for controlling a continuously variable transmission of a motor vehicle, and particularly in a serially arranged valve device, the pressure on the side of the pressure source or pump can be throttled while, at the same time, assurance is provided that at least part of the time, but preferably in all situations where a transmission ratio change is intended, the pressure acting on the transmission is sufficient to perform the intended ratio change. Thus, the inventive concept provides in particular that, in a valve device for maintaining or changing a set transmission ratio, the pressure can be throttled, the valve device being in particular a serially arranged valve device comprising preferably less than 3, but with particular preference one and only one piston.

In accordance with a particularly preferred embodiment of the invention, the control device for controlling a continuously variable transmission is configured to adapt itself to the demand for pressure, so that in particular the energizing pressure for changing the transmission can be adjusted to the required pressure level. The demand-adapting control device assures in particular that the system pressure level remains essentially low but is always sufficient to perform the transmission ratio change as required in any given situation. The control is performed, for example, through a hydraulic system that operates according to a dual-piston principle that makes use of the fact that the pressure levels existing in different chambers or conduits are additive in generating a resultant pressure in a way where the resultant summation pressure does not have to be actually present in a separate chamber or conduit.

According to the invention, a control device for controlling the transmission, particularly an at least in part hydraulically based control device, comprises at least one device for setting a target value, at least one device for generating the targeted pressure, at least one device for comparing a target value with an actual value, and at least one device for correcting the actual value if the actual value and the target value are different from each other. Preferably, the device for setting the target value generates a signal that can, e.g., also be in the form of a pressure level. The preferred mode of functioning is that a valve device takes on a condition corresponding to the given target value, so that the controlled parameter, particularly a pressure level, takes on a certain actual value. The invention provides in particular that the process of making an actual value conform to a target is performed within a single valve device, particularly a valve device with fewer than three pistons and one cylinder. With special preference, the process is performed within a valve with one piston and one cylinder.

According to a particularly preferred embodiment of the invention, the control device for controlling a continuously variable transmission of a motor vehicle, particularly a control device configured at least in part as a hydraulic device, comprises a valve device in the form of a piston-cylinder device. Within the latter, chambers are formed at least part of the time in an arrangement where the axially projected wall portions that belong to the piston device are of unequal size relative to the directions of the two opposite piston ends. As a result, with an equal amount of pressure acting on both sides, there will be a resultant force on the piston, provided there are no other forces acting on the piston.

In order of preference, the continuously variable transmission comprises at least one, better two, sets of disks, each set consisting of at least two disks with a contact area for receiving an endless flexible torque-transmitting device. In the area for receiving an endless flexible torque-transmitting device, the axial distance between the disk changes as a function of the radius. Preferably, the respective portions of the disks are given a conical shape. Other cross-sectional shapes such as, e.g., segments of circles are likewise within the range of preferred configurations. As a preferred concept according to the invention, the valve device has for each disk set (particularly for disk sets of the kind just described) at least one chamber with different-sized wall areas in the two piston-travel directions so that, with no other forces acting on the piston and with a constant amount of pressure within the chamber, there will be a resultant force on the piston.

Preferably, the valve device is configured as a piston-cylinder unit in which the cylinder device has a continuous, essentially uninterrupted interior space. With preference, the interior space serves to accommodate the piston device.

In accordance with a particularly preferred embodiment of the invention, the valve device, meaning the piston-cylinder unit, comprises fewer than three, with particular preference fewer than two, pistons that are movable in relation to each other. Preferably, the valve device is configured as a linear displacement valve device. With special preference, the valve device is configured with a pressure return.

In accordance with a particularly preferred embodiment of the invention, the valve device that serves in particular to change the transmission ratio, has at least one channel that runs inside the piston at least partially in the axial direction or has at least components running along an axial direction.

It is also preferred if at least one of the channels inside the piston can accommodate an internal slide, particularly one with an essentially fixed arrangement in relation to the cylinder device.

A particularly preferred embodiment of a motor vehicle in accordance with the invention comprises within a valve device for controlling a continuously variable transmission at least one channel running at least partially in an axial direction inside the piston and at least one opening or channel extending from the inside channel towards the outside surface of the piston. It is preferable to have two such openings or channels from the interior of the piston to the outside. With particular preference, there are two such openings at different axial positions on the piston. A preferred embodiment of an inventive valve device for controlling a continuously variable transmission of a motor vehicle comprises at least one hydraulic OR-gate, where the particular function of the valve device is to change and maintain the transmission ratio. Further, in an especially preferred version, this kind of valve device does not have nor require a hydraulic OR-gate.

In accordance with a particularly preferred embodiment of the invention, the valve device has at least one, preferably two, connector terminals for a connecting conduit to a pump.

It is particularly preferred if the valve device for controlling the continuously variable transmission comprises at least one connector terminal for a connection to a torque sensor.

With preference, the valve device has at least one connector terminal for a conduit to generate a compressive contact force between at least one disk pair and an endless flexible torque-transmitting device. In particular, the compressive contact force serves to maintain the transmission ratio at a set level.

In accordance with a particularly preferred embodiment of the invention, the valve device has at least one connector terminal for a hydraulic connection to at least one proportional valve.

With preference, the valve device has at least one connector terminal for a means of conducting the energizing pressure to at least a first and/or at least a second set of disks of the hydraulically controlled transmission.

It is a particularly preferred feature, that for a change in the direction towards "overdrive", pressure can be applied to a first set of disks through a connecting conduit and for a change in the direction towards "underdrive", pressure can be applied to another disk set. Preferably, the possibility is provided to allow the respective pressures for changing the transmission ratio towards "underdrive" and "overdrive" to be applied through a conduit that is connected to a single connector terminal of the valve device. However, first preference is given to a configuration in which separate connector terminals for pressure conduits are provided both for a change towards "overdrive" as well as for a change towards "underdrive". In the latter case, the disk sets that are not subjected to a change-energizing pressure at a particular moment are preferably put into a pressure-free state.

In accordance with a particularly preferred embodiment of the invention, the valve device can perform or can be controlled to perform the function of maintaining the transmission ratio of the disk sets of the transmission at a set level as well as the function of setting the transmission ratio to a new level. The valve device through which the two functions are controlled has fewer than twelve, preferably fewer than nine, and with particular preference fewer than eight connector terminals.

In a particularly preferred embodiment, the valve device is configured as a piston-cylinder device wherein the valve device is spring-biased in at least one position, preferably by a compression spring, with a lesser degree of preference given to a tensile spring. In accordance with a particularly preferred embodiment of the invention, a spring force holds the piston device in one end position of the piston.

Preferably, at least one end stop is provided for the purpose of limiting piston travel or, in other words, to limit the piston displacement in the cylinder device. With preference, the end stop is provided between the end positions of the cylinder device. With particular preference, an end stop of this kind extends at least partially from the inner surface of the cylinder device towards the interior of the cylinder, Further, as a preferred feature, the valve device comprises a throttling element of preferably variable throttle cross-section that serves to throttle the pressure supplied by the pressure source or pump if the supplied pressure exceeds a preset level.

In accordance with a particularly preferred embodiment of the invention, a valve device is provided for changing the transmission ratio of a continuously variable transmission as well as for maintaining the transmission ratio at a set level. The valve device serves to apply the change-energizing pressure as well as the ratio-maintaining pressure. Between this valve device and the transmission, the preferred arrangement is to have no other settable control valve device.

It is further preferred if between the valve device and the continuously variable transmission, there is a connecting conduit that opens into the pressure chamber of a torque sensor. It is preferred to have no other settable valve device between the valve device and the point of entry into the torque sensor chamber, and it is particularly preferred to have no valve device of any kind. With strong preference, there is likewise no settable valve device arranged in the other connecting conduits between the valve device and the transmission, but the strongest preference is for no valve device of any kind.

In accordance with a particularly preferred embodiment of the invention, the valve device is configured as a piston-cylinder device wherein pressure can be applied to at last one of the axially facing surfaces of the piston device. It is also within the range of design possibilities to provide means for applying pressure to both of the axially facing surfaces of the piston device.

In accordance with a highly preferred embodiment of the invention, the valve device has at least one connector terminal for a valve-control conduit that is at least part of the time supplied with a valve-control pressure, particularly with a settable pressure that represents a target value for the amount of displacement of the valve device.

In accordance with a particularly preferred embodiment of the invention, the piston device of the valve device, e.g., in the configuration as described above, comprises a hollow interior space to accommodate an internal slide in an arrangement where the frontal end surface of the slide makes up at least part of the difference in surface area that produces a net resultant force when pressure is applied to a chamber.

Particularly preferred is an arrangement in which an equilibrium of the forces in the travel direction of the piston establishes itself at all times between a force that is due to the presence of an internal slide, a spring force acting on the piston device, a valve-control force, as well as an (additional) force caused by the difference in the projected surface areas inside a chamber of the piston device.

A valve-control force, in this particular context, can be defined as a force that occurs as a consequence of a change-energizing pressure that has been applied to the piston device.

In a particularly preferred embodiment of the invention, a valve device which, with strong preference, includes a ring channel designed for this purpose, allows a connection to be established between a pressure-supplying terminal and a connecting terminal for energizing a change of the transmission ratio. It is particularly preferred if the fluid streaming at least in part from the pressure-supplying terminal through the valve device towards the conduit for energizing the transmission-ratio change passes through or is held at zero velocity in a chamber of the valve device and if the wall portions of the chamber that belong to the piston device have different projected surface areas in the two opposite directions of piston displacement travel.

As another preferred feature of the invention, it is further to be noted that the fluid-flow connection from the pressure-supply through the valve device to the change-energizing conduit of the transmission can also be interrupted at least part of the time without causing a change of the chamber geometry.

In a particularly preferred embodiment of the invention, the aforementioned arrangement of a pressure conduit, a chamber with different projected surface areas, and a change-energizing conduit is provided in duplicate form, i.e., for effecting changes either towards "overdrive" or "underdrive", respectively.

According to a particularly preferred embodiment of the invention, chambers of the kind described above, i.e., chambers with different projected surface areas in opposite piston travel directions, are supplied through different terminals with different pressure levels, with the pressure that determines the net piston force being present at one of the terminals. It is to be noted that the different pressure levels can occur, e.g., as a consequence of a throttle device, particularly one that can be set at variable levels.

In accordance with a particularly preferred embodiment of the invention, there is a relationship of mutual dependency between the force that acts on the piston device as a result of the different projected surface areas and a throttling device with a controllable variable passage cross-section that is arranged between a pressure-supplying conduit and a change-energizing conduit for changing the transmission ratio. Thus, the inventive concept provides in particular that for a given throttle cross-section, a force establishes itself on the piston device because of the difference in the projected surface areas and that this, in turn, causes a change of the throttle cross-section. Now, the change of the throttle cross-section leads to a pressure change on the projected surface areas which, again in turn, changes the throttle cross-section, and so on. In this manner, the system is regulated to settle into a certain piston position, particularly when aided by the supplemental effects of a spring force, a control-pressure force, and/or by providing a second device with a chamber with different projected surface areas.

In accordance with a particularly preferred embodiment of the invention, the continuously variable transmission is a conical-disk transmission with an endless flexible torque-transmitting device.

A conical-disk transmission with an endless flexible torque-transmitting device preferably comprises two pairs of disks, one of which is essentially locked to a rotatory input and the other to a rotatory output at least part of the time. Preferably, each of these (conical) disk pairs has an axially movable and an axially fixed disk-like part. An endless flexible torque-transmitting device such as a chain engages in particular the surfaces of the disk-like parts that face each other, whereby a torque can be transmitted from one disk pair to the other. Preferably, the chain has transverse bolts that bear against the tapered surfaces of the conical disks so that the friction force allows a torque to be transmitted. Because of the defined contact length between the conical disks and the chain, the friction force between the endless flexible torque-transmitting device and the disk pairs can be regulated and controlled through the amount of contact pressure force that is applied to the pairs of conical disks.

To effect a change of the transmission ratio, the conical disk pairs or, more precisely, the spacing of the disks of a pair in relation to each other, can be changed in a manner that is coordinated between the disk pairs. At least one actuator member is provided for this purpose, preferably of an at least partially hydraulic type and comprising at least one valve device of the kind described above.

According to a particularly preferred embodiment of the invention, at least one pressure chamber is arranged on at least one, but preferably on all, of the movable disks for the purpose of changing and/or maintaining the axial position of the movable disk. Essentially, the chamber adjoins the movable disk.

It is also particularly preferred if at least two hydraulic chambers are arranged at each axially movable disk, either in a parallel and/or a serial arrangement.

In a preferred arrangement, at least one of the chambers serves to set the ratio of the transmission. It is also preferred, if at least one of the chambers is used to maintain the transmission at a set ratio. In a particularly preferred embodiment of the invention, a torque sensor is arranged on the input shaft of the transmission. Preferably, the torque sensor converts a torque that is carried by a shaft, particularly an input shaft, into a corresponding amount of pressure. The preferred arrangement to accomplish this purpose is for the torque sensor to comprise at least two elements that are movable in relation to each other and for at least one of the elements to comprise a cam disk. Preferably, the cam disk is mounted in an axially fixed condition but has at least a limited degree of rotational freedom. The one or two cam disks have at least one tapered ramp. Arranged between the two parts or, more precisely, between the tapered ramps, is a space-holding body in the form of, e.g., a ball or a roller. When the two parts rotate in relation to each other, the space-holding body, e.g., the ball, runs along the tapered ramp and thereby changes the spacing of the two parts from each other. The traveling part in this arrangement belongs to a pressure chamber whose volume is decreased or increased by the axial travel of the part. Consequently, the volume change gives rise to a pressure change of a medium contained in the chamber.

In accordance with a particularly preferred embodiment of the invention, it is possible to connect the pressure chamber of the torque sensor at least partially to an outlet channel. It is especially preferred to insert a controllable throttle in the path of an outlet channel leading at least partially into the pressure chamber of the torque sensor. In accordance with a particularly preferred embodiment of the invention, the effective throttle cross-section of this throttle is dependent on the pressure level in the pressure chamber of the torque sensor and/or it is dependent on the torque acting on the torque sensor.

The object of the invention can also be achieved through a method in which a motor vehicle with a continuously variable transmission is operated in accordance with the following steps: First, at least one target value is set for a transmission ratio and/or a pressure level. Next, at least one actual value is determined for the target parameter, the actual value is compared against the target value and, if a difference is found between actual and target value, a correction is made to bring the respective parameter in line with the set target.

In a particularly preferred form of the method, at least two target values are set for transmission ratios and/or pressure levels of the continuously variable transmission.

The novel features which are considered as characteristic of the invention are set fourth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

FIG. 5 is a schematic representation of an example of a fifth embodiment of the invention;

DETAILED DESCRIPTION OF THE INVENTION

Figure 1:
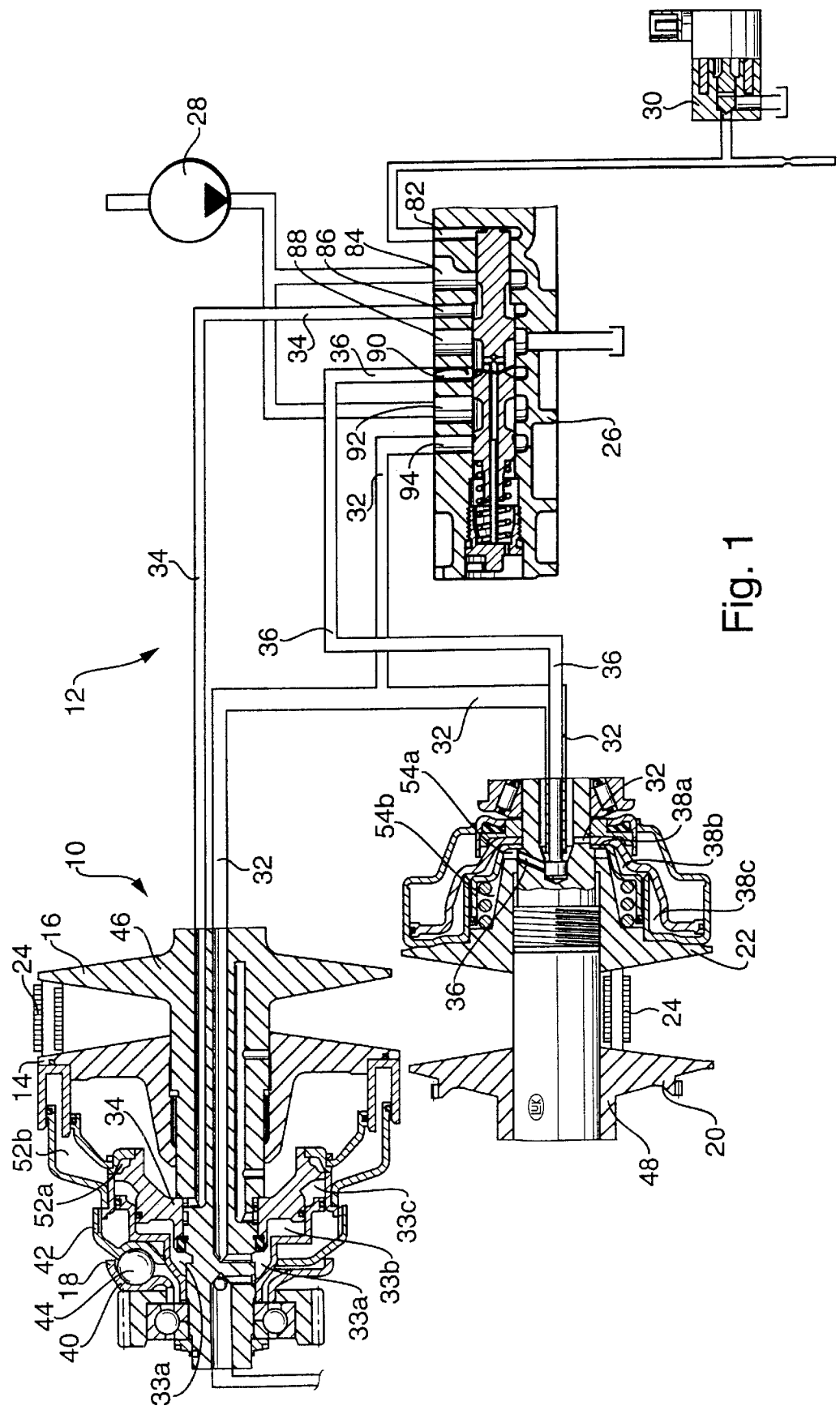
FIG. 1 is a schematic representation of an example of a first embodiment of the invention.

FIG. 1 shows an example of a first embodiment of the invention in a schematic representation.

The continuously variable transmission 10 of a motor vehicle (not shown) is controlled by the hydraulic device 12.

The continuously variable transmission 10 comprises in particular a first set of disks 14, 16 with a torque-sensor device 18, a second set of disks 20, 22, and an endless flexible torque-transmitting device in the form of a chain 24 that is wound around the disk sets.

The set of disks 14, 16 is essentially comprised of a conical disk 16 that is mounted in an axially fixed position and a conical disk 14 which, in the example of FIG. 1, is arranged to be axially movable on the hub of the axially fixed conical disk 16. The distance of the disk set 14, 16 from the disk set 20, 22 can be variable. Preferred, however, is an arrangement where the distance is fixed.

Particularly in the case where the axles of the disk sets are at a fixed distance from each other, the closing of one disk set, i.e., the narrowing of the distance between the disks 14, 16 or between the disks 20, 22, causes the chain 24 to move to a position of greater radius within the respective disk set. However, because the chain has a defined, invariable length, the repositioning of the chain at a greater radius in one disk set has to be accompanied by a repositioning of the chain at a smaller radius in the other disk set, at least if the axles of the disk sets are arranged at a non-variable distance from each other. The repositioning at a smaller radius, in turn, causes the respective disk set to open up, i.e., the distance between the disks is widened.

Thus, when the disks of one of the sets 14, 16 or 20, 22 are closed, i.e., moved closer together, this causes the disks of the other set to open, i.e., to move farther apart. This causes the forces between the disks and the chain to be transmitted at different radii, which has the effect of changing the transmission ratio. Depending on whether an external, change-inducing force is applied to one or the other of the disk sets 14, 16 and 20, 22, the transmission ratio is changed either in the direction towards "overdrive" or in the direction towards "underdrive". It should be noted that, within the present context, the disk set 14, 16 is arranged on the torque-input side and the disk set 20, 22 is arranged on the torque-output side of the transmission.

It needs to be pointed out that the axial displacements of the disk sets as described above require the presence of a net resultant force, meaning that the application of a force to one of the disk sets will not produce any displacement if an essentially equal amount of force is also applied to the other disk set. To further clarify this point, there will be no displacement of the disk sets even if the exterior forces applied to the movably mounted disks 14 and 20 are different by themselves but the forces acting overall on each disk set are in equilibrium.

The displacement of the disk sets, i.e., the application of a displacement-producing force is performed by the hydraulic device 12.

The hydraulic device 12 has, in particular, the following two functions:

The first function is to generate a "holding pressure" on the conical disk pairs 14, 16 and 20, 22 which, in turn, is also applied to the chain. The holding pressure ensures that a set transmission ratio stays constant during the operation of the transmission unless a change of the transmission ratio is expressly called for.

The second function is to change the transmission ratio from a set level to a different level. This change is brought about in particular by applying an added amount of pressure to one of the disk pairs. The added pressure can be applied to the conical disk pairs where the chain at the particular instant is seated at a smaller radius. However, other ways of applying pressure are also within the scope of inventive solutions. The aforementioned form of pressure application is suggested, e.g., if the conical disk pairs 14, 16 and 20, 22 are arranged and configured so that the chain moves to a position of greater radius on the side where the pressure is applied.

The control of the holding pressure and the change-energizing pressure is performed by a valve device 26. The valve device 26 is connected on the one hand to a hydraulic pressure source 28 and on the other hand to a proportional valve device 30 generating a valve-control pressure. The valve device, which will be explained more closely on the basis of FIGS. 2*a* through 2*e*, is interposed between the hydraulic pressure source 28 and the hydraulic conduit systems 32, 34, 36.

A particular purpose of the valve device 26 is to provide control over the amount and/or direction of the volume flow through the hydraulic conduit systems 32, 34, 36.

The other ends (in relation to the valve device 26) of the conduit systems 32, 34, 36 are connected to chambers or arrangements of chambers that adjoin or are part of the transmission.

Thus, for example the pressure conduit 32 as well as the chamber systems 33*a*, 33*b*, 33*c* or 38*a*, 38*b*, 38*c* serve to apply an amount of pressure to the respective disk sets 14, 16 or 20, 22 which, in preferred embodiments of the invention, can be set, regulated, or controlled.

The pressure applied to the disk sets can be set, regulated, or controlled through the torque sensor 18, preferably as a function of the magnitude of the torque being introduced from the engine.

For example, the torque sensor can have a first part 40 in a fixed arrangement and a second part 42 that is movable in relation to the first part at least within a segmental range. Interposed between the two parts, at least one of which comprises a cam disk or a tapered ramp, is a space-holding body that, in the illustrated arrangement, has the form of a spherical ball 44.

The angular displacement of the second part 42 in relation to the first part 40, which is a function of the driving torque or the torque acting on the torque sensor 18, has the effect that the ball 44 moves up the tapered ramp. Consequently, the axial distance between the fixed element 40 and the movable element 42 is increased. This change in linear distance is accompanied by a volume change of at least one of the chambers 33*a*, 33*b*, 33*c*, particularly of the chamber 33*a*. At least partially as a function of the volume change, a change in pressure takes place in at least one of the chambers 33*a*, 33*b*, so that the disks can be pressurized to a degree that depends at least in part on the engine torque.

For example, it is possible in this manner to generate a "symmetric" amount of force on both disk pairs 14, 16 and 20, 22. This causes in both disk pairs 14, 16 and 20, 22 the tendency to push the seat of the chain 24 radially outwards. Particularly if the net resultant forces on the chain 24 are symmetric, the chain will be held so that it stays at the same radius between the disks. Of particular importance is the friction force that acts between the chain 24 and the disk sets 14, 16 and 20, 22, because it is through this friction force that a torque is transmitted from the disk set 14, 16 to the disk set 20, 22.

The transmission ratio between the shafts 46 and 48 that carry the respective disk sets 14, 16 and 20, 22 is changed by the application of an energizing pressure to the disk sets 14, 16 and 20, 22 through the valve device 26 and the hydraulic conduit systems 36 and 34. The inventive concept provides in particular that the transmission ratio can be changed in a first direction by applying pressure via the hydraulic conduit system 34 to an arrangement consisting of at least one chamber.

As has already been described above, the application of pressure has the effect of pushing the conical disks 14, 16 closer together. In this state of the transmission, the energizing conduit 36 for the conical disk set 20, 22 is essentially pressure-free.

In an analogous manner, the transmission ratio is changed in a second, i.e., opposite, direction by applying pressure via the hydraulic conduit system 36 to an arrangement consisting of at least one chamber 54a, 54b, with the effect that the seat of the chain 24 between the disks 20, 22 is pushed radially outwards. At the same time, the seat of the chain between the disks 14, 16 has to adjust itself to the changed conditions, i.e., the seat of the chain 24 between the disks 14, 16 will move radially inwards towards the shaft 46.

It should be noted that the energizing conduits 34, 36 that particularly serve to increase the pressure on one of the disk sets 14, 16 or 20, 22, can also be used to maintain a set position where the chain and the disk sets 14, 16 and 20, 22 are in equilibrium. For example, in addition to a constant pressure level applied through the conduit system 32 with preferably equal magnitude to both of the disk sets 14, 16 and 20, 22, an additional, superimposed pressure can be applied through the conduit system 36 or the conduit system 34, for example in a case where the required amount of force on the disk sets 14, 16 and 20, 22 depends on the ratio that has been set for the transmission. Thus, for example if different amounts of force are required for holding the disk sets 14, 16 and 20, 22 in an equilibrium position, it is possible to apply an additional, superimposed pressure to at least one of the disk sets 14, 16 and 20, 22 through the hydraulic conduits 34 or 36 so as to ensure equilibrium, particularly with respect to maintaining the transmission ratio.

Figure 2A:
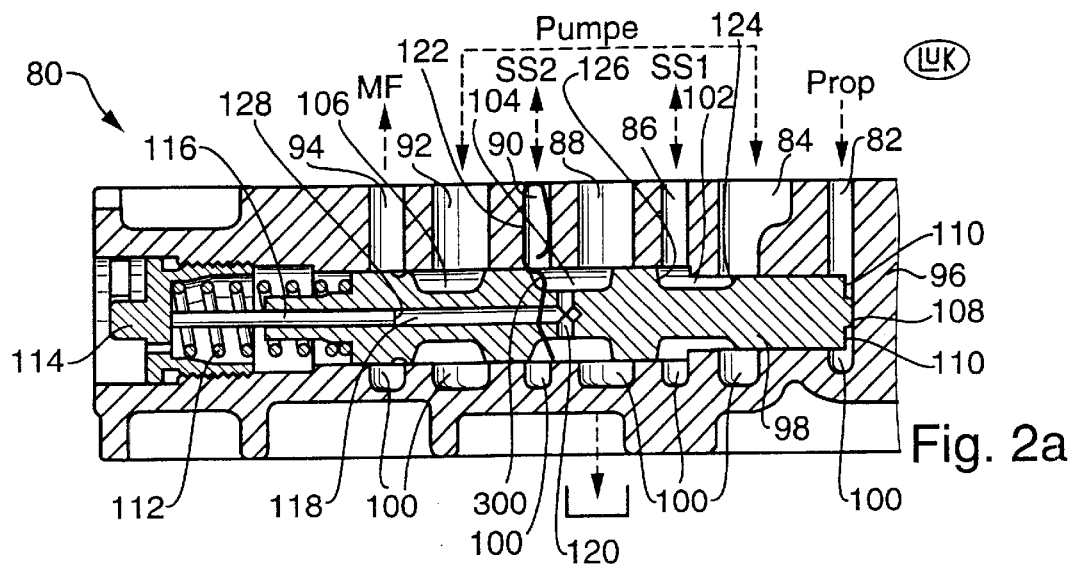
FIG. 2*a* is a schematic representation of an example of a second embodiment of the invention shown in a first position of the valve device.

The FIGS. 2a through 2e illustrate parts of a second exemplary embodiment of the invention in a schematic representation. The difference between the representations of FIGS. 2a through 2e lies particularly in the positions, i.e., in the operational states, of the valve device 80. FIG. 2a shows a first position of the valve device 80. In the illustrated arrangement, the valve device 80 comprises seven connector terminals 82, 84, 86, 88, 90, 92, 94, which are arranged preferably in that order along the axis of the valve device 80. In particular, the connector terminal 82 of the valve device 80 serves to receive a conduit that connects to a proportional valve. The connector terminals 84 and 92 are used, e.g., to receive conduits that connect to the pump. The connector terminal 94 serves, e.g., to receive a conduit that connects to the pressure chamber of a torque sensor. The connector terminal 86 serves, e.g., to receive a conduit through which pressure can be applied to a first disk set 14, 16. In analogous manner, the connector terminal 90 serves, e.g., to receive a conduit through which pressure can be applied to a second disk set 20, 22. The terminal 88 can be connected, e.g., to an oil sump, to put the valve device into a pressure-free state.

The valve device 80 comprises in particular a cylinder device 96 and a piston device 98.

The arrangement is such that the piston device 98 is axially movable in relation to the cylinder device 96.

A plurality of ring channels 100 are arranged inside the cylinder device 96, e.g., for the purpose of improving the flow of the hydraulic medium. Furthermore, there are ring channels 102, 104, 106 arranged on the piston device 98. The ring channels 102, 104, 106 serve in particular as connections among different sub-combinations of the connector terminals 84, 86, 88, 90, 92, 94. One end of the piston device has a protrusion 108. The purpose of the protrusion 108 is to ensure that, by pressurizing the connector terminal 82, an axial force can be applied to the piston even when the piston device 98 is at its extreme end position (the rightmost position in relation to the illustrated arrangement) where its end surface is in tight contact against the cylinder device 96. In this state, the magnitude of the axial force acting on the piston is determined as the product of the ring-shaped area 110 multiplied by the amount of pressure that is introduced through the connector terminal 82. Once the piston 98, which is preferably configured as a single, monolithic component, has "lifted off" from the cylinder device 96, the pressure entering through the connector terminal 82 acts on the entire axially directed end surface of the piston.

A spring device 112 works at the opposite end of the piston device 98. The spring device is seated against a support bushing 114 that is screwed into the cylinder device in an essentially fixed connection. The spring device 112 is configured preferably as a compression spring.

An internal slide 116 extends essentially inside the spring device. Preferably, the internal slide is arranged in an essentially fixed relationship to the cylinder device 96, i.e., firmly attached to the support bushing 114. The internal slide 116 extends essentially parallel to the axis of the cylinder device 96 and runs at least partway inside an interior channel 118 of the piston device 98. Openings 120 run essentially in a radial direction from the interior channel 118 to the circumference of the piston device 98.

A displacement-limiting stop 122 restricts at least partially, i.e., under certain conditions, the free movement of the piston device 98 in relation to the cylinder device 96.

In the example of FIGS. 2a through 2e, the position of the valve device in FIG. 2a represents a state where the connector terminal 94, and thus the torque sensor, is substantially disconnected from all of the other connector terminals 92, 90, 88, 86, 84, 82. The same can be said for the connector terminal 92 that leads to the pump. Terminal 90, which leads to the second disk set 20, 22, is connected through the ring channel 104 to terminal 88 leading to the oil sump. Likewise, terminal 86, which leads to the first disk set 14, 16, is connected through the ring channel 102 to terminal 84 leading to the pump.

Accordingly, the valve position of the foregoing description represents a state where pressure is applied to the first disk set 14, 16, so that the seat of the chain 24 on the first disk set moves radially outwards.

Figure 2B:
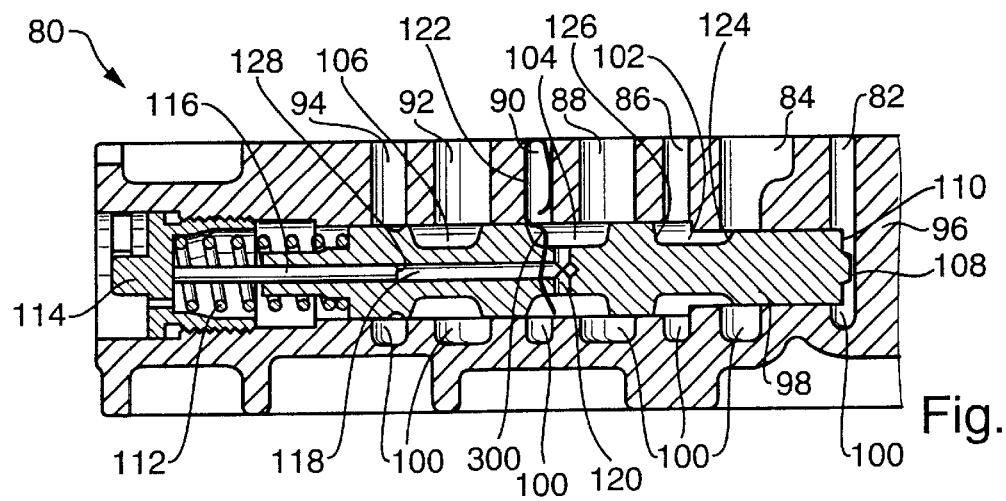
FIG. 2*b* is a schematic representation of an example of a second embodiment of the invention shown in a second position of the valve device.

A target value for the amount of axial displacement of the piston device 98 can by set through the amount of pressure that is applied at connector terminal 82. FIG. 2b illustrates the movement of the piston device 98 that occurs as a result of pressurizing the connector terminal 82. In FIG. 2b, the pressure introduced through terminal 82 already acts on the entire axially directed end surface of the piston device 98. The piston device moves against the force of the spring device 112. The pressure that exists in ring channel 102 acts at the same time against the first projected surface area 124 and the second projected surface area 126, where the term "projected surface area" stands for the projections of the walls of the ring channel 102 onto a plane that is perpendicular to the axis of the piston device 98. As can be seen in the FIGS. 2a through 2e, the projected surface area 126 is greater than the projected surface area 124. Consequently, the force introduced into the piston device through the pump pressure in FIG. 2b is directed to the left, because the projected surface area 126 is greater than the projected surface area 124.

Figure 2C:
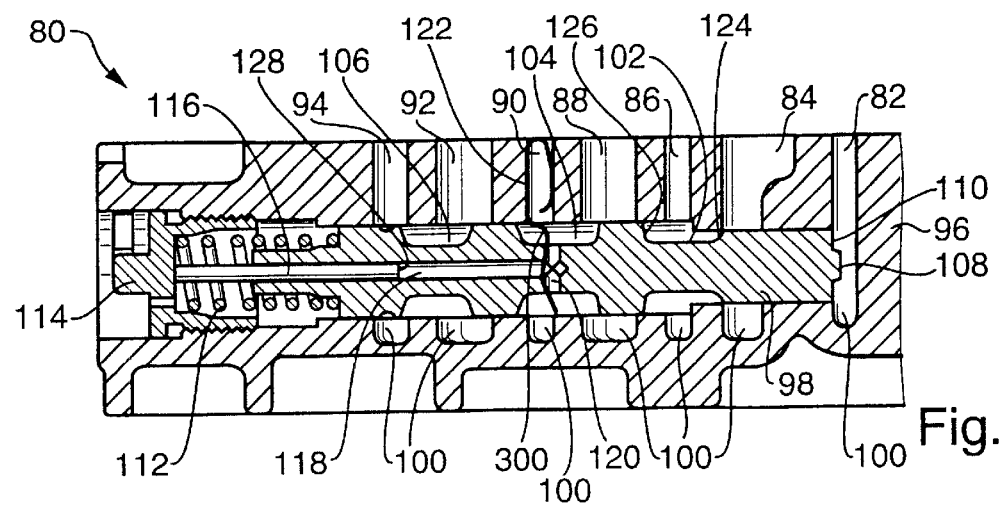
FIG. 2*c* is a schematic representation of an example of a second embodiment of the invention shown in a third position of the valve device.

FIG. 2c shows a third position of the valve device according to the example of a second embodiment of the invention.

As in FIGS. 2a and 2b, the radially directed openings 120 essentially communicate with the pressure-free connector terminal 88. Thus, in the valve position of FIG. 2c, likewise, there is essentially no force pushing against the end surface 128 of the internal slide 116, so that there is also no corresponding reactive force pushing against the piston device 98. The spring device 112 which bears against the support bushing 114 and the piston device 98 is subjected to an increased amount of compression in comparison to the conditions illustrated in FIGS. 2a and 2b, meaning that the spring exerts an increased amount of force against the piston. With the valve in the position of FIG. 2c, the piston device 98 has advanced to the point where the previously existing connection between the connector terminals 84 and 86 through the ring channel 102 has been interrupted. Instead, a connection between the connector terminals 92 and 94 through the ring channel 106 has been opened so that an amount of pressure can be directed towards the torque sensor or the conduit system 32 by which the disk sets 14, 16 and 20, 22 are held at a set transmission ratio.

The force acting on the piston device as a result of the difference between the projected surface areas 124, 126 is negligible or non-existent in this state of the valve device, because the ring channel 102 communicates in essence only with the connector terminal that serves to change the position of the first disk set 14, 16. Also, in this position of the valve device, the connector terminal for changing the second disk set communicates in essence with the oil sump so that here, too, there is essentially no change-energizing pressure applied to the disk set.

Thus, the transmission ratio is in essence being held at a set level.

Figure 2D:
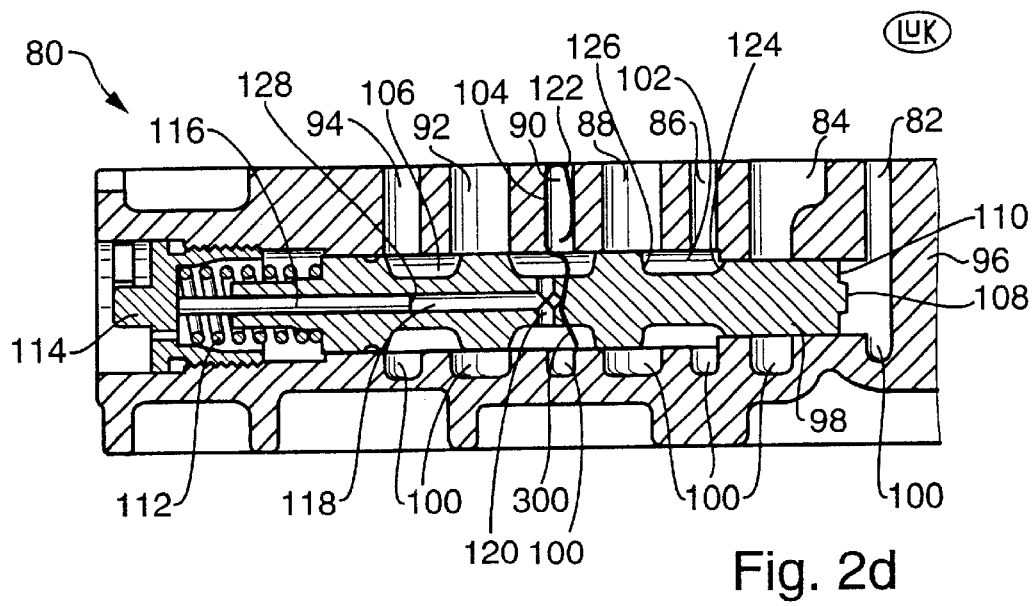
FIG. 2*d* is a schematic representation of an example of a second embodiment of the invention shown in a fourth position of the valve device.

With a further displacement to the left, which is regulated preferably through the amount of pressure applied to the terminal 82 (in the same manner as the other displacements), the piston device moves to the position shown in FIG. 2d. The ring channel 102 has now advanced to the point where the terminal 86 communicates with the terminal 88. Thus, the terminal for changing the first disk set is at essentially the same pressure level as the oil sump.

The terminal 90 for changing the second disk set essentially dead-ends at the ring channel 104 so that terminal 90, too, is essentially pressure free. Consequently, the end surface 128 of the internal slide 116, likewise, is pressure-free or under a negligible amount of pressure.

In regard to the terms "pressure free" and "negligible amount of pressure", it should be noted that, strictly speaking, the pressure forces in question enter into the aggregate sum of the forces by which the equilibrium of the piston device 98 is governed.

The connector terminal 92 leading to the pump communicates through the ring channel 106 with the terminal for the torque sensor, so that the disk sets 14, 16 and 20, 22 continue to be held at the existing transmission ratio.

It should be noted in this context that while a piston movement is in progress, even with a constant pressure level at terminal 92 (and likewise when analogous conditions are present at other terminals), the pressure at terminal 94 will undergo a change, because the cross-sectional area of the opening between the two terminals changes during the course of the piston movement. Consequently, the opening represents a kind of throttle with a variable cross-section. Thus, a throttle element 130 exists at least during a transient period.

Figure 2E:
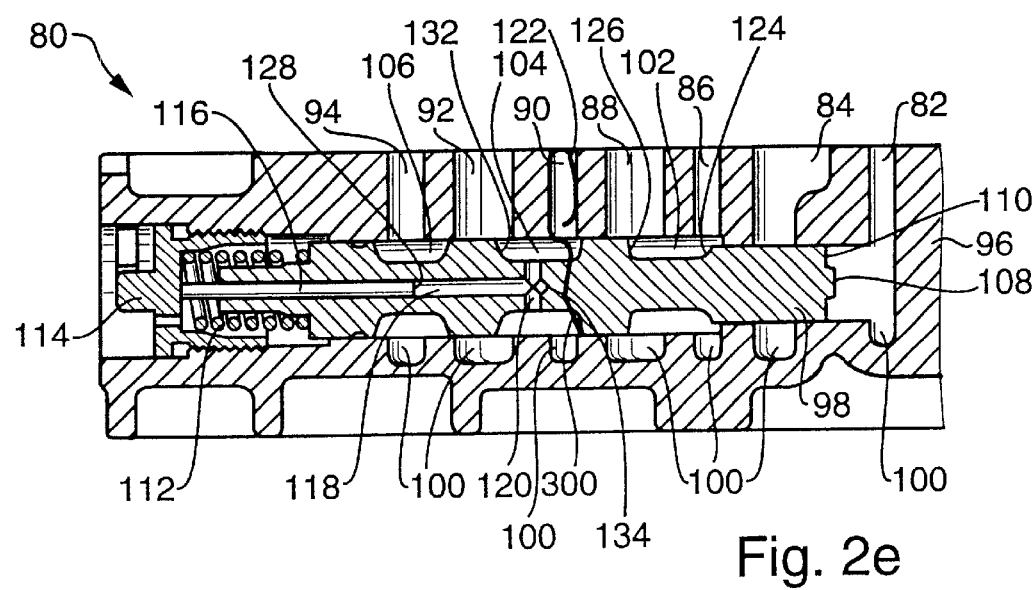
FIG. 2*e* is a schematic representation of an example of a second embodiment of the invention shown in a fifth position of the valve device.

FIG. 2e illustrates an example of a second embodiment of the invention in a fifth position of the valve device. Here the terminal 94 for the torque sensor and for maintaining the transmission ratio at a set level dead-ends at the ring channel 106. Terminal 90 which leads to the disk set 20, 22 communicates with the terminal 92 that leads to the pump. Consequently, pressure is being supplied to the second disk set. The pressure in ring channel 104 also acts through the radial openings 120 and the interior channel 118 against the end surface 128 of the internal slide 116. The reaction to this pressure acts against a corresponding surface 134 on the piston device, generating a resultant force of an amount that is essentially determined as the product of the pressure in ring channel 104 multiplied by the area of surface 134.

It should be noted that the throttle 132 under the conditions of FIG. 2e is located on the pump side of ring channel 104. Consequently, the pressure level existing in ring channel 104 and acting against the end surface 128 of the internal slide 116 has already been lowered. According to an embodiment of the invention that is not represented here, the throttle is arranged on the disk-set side of the ring channel. In this case, the pump pressure would determine the amount of pressure acting on the piston.

It is to be noted that with the arrangement as described above, a state of equilibrium will always establish itself, essentially between the following four forces: The pressure against the ring-shaped area 110 or the end surface of the piston device 98 generates a leftward-directed force in the FIGS. 2a through 2e. The spring device 112 generates a spring force in the opposite direction. The pressure in ring channel 102 generates a leftward-directed force that occurs as a result of the projected surface area 126 being greater than the projected surface area 124. The pressure in ring channel 104 generates the fourth of the forces that participate in the equilibrium of the piston device, directed likewise to the right and resulting from the application of the same pressure against the respective end surfaces 128 and 134 of the internal slide 116 and the interior channel 118, which has the effect of pushing the piston to the right.

Figure 3:
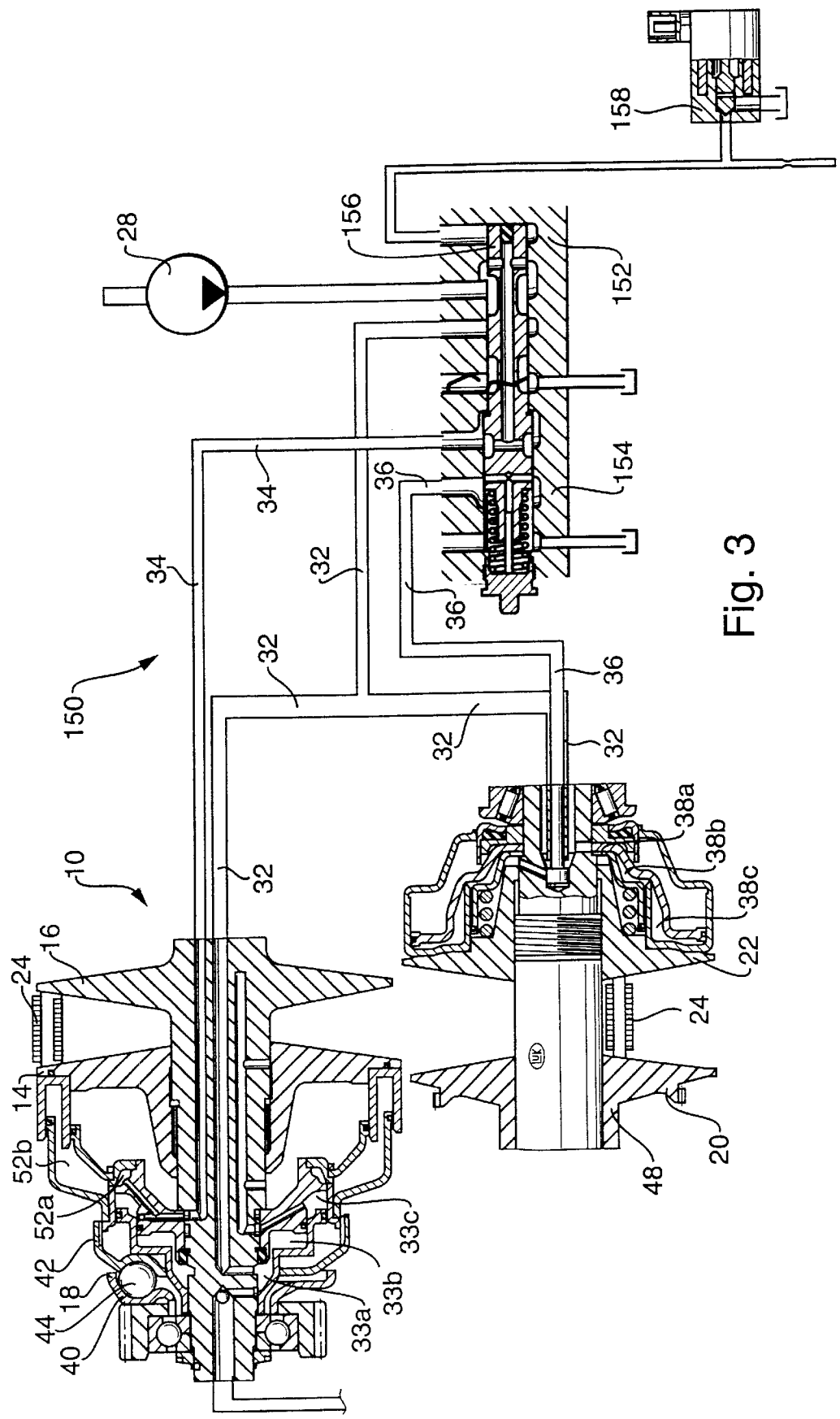
FIG. 3 is a schematic representation of an example of a third embodiment of the invention.

FIG. 3 shows an example of a third embodiment of the invention in a schematic representation. While the continuously variable transmission 10 corresponds essentially to the transmission of FIG. 1, the main difference lies in the hydraulic device 150 in comparison to the hydraulic device 12 of FIG. 1. Differences exist in particular between the valve device 26 of FIG. 1 and the valve device 152 of FIG. 3, although the latter comprises a valve cylinder 154 as well as a valve piston 156, analogous to the embodiment of FIG. 1. In addition, the embodiment of FIG. 3 preferably includes a proportional valve 158 arranged ahead of the valve device 152 in the control chain.

The FIGS. 4a through 4e illustrate a fourth exemplary embodiment of the invention in a schematic representation with five different positions of the valve device 174. Configured preferably with a single-piece cylinder 96 and a single-piece piston 98, the valve device 174 comprises seven connector terminals 160, 162, 164, 166, 168, 170, 172, which are arranged preferably in the following order in the axial direction of the piston device 98:

The connector terminal 162 serves to receive a conduit that connects to a pump. The connector terminal 164 is used to receive a conduit that connects to a torque sensor or to a connecting conduit or conduit system by which a holding pressure can be applied to the transmission 10. The connector terminal 166 leads to a hydraulic oil sump. The connector terminal 168 serves to receive a hydraulic conduit or conduit system for applying pressure to the first disk set 14, 16. The terminal 170 serves to receive a connecting conduit by which the second disk set can be pressurized.

The valve device 174 comprises an interior channel 118 in which an internal slide 116 is received. The internal slide has an end surface 128 to which pressure can be applied so that a reactive force pushes against the piston device 98. Openings 120 extend preferably in a radial direction from the interior channel 118 to the circumference of the piston device 98.

A second interior channel 176 extends inside the piston device 98. In this arrangement, channel 176 serves as an internal connecting conduit for hydraulic oil, but it is also suitable to receive, e.g., an internal piston slide that could be a fixed part of the cylinder device.

Accordingly, the interior channel 176, too, has openings 178, 180 that extend preferably in a radial direction from the interior channel 176 to the circumference of the piston device 98.

Figure 4A:
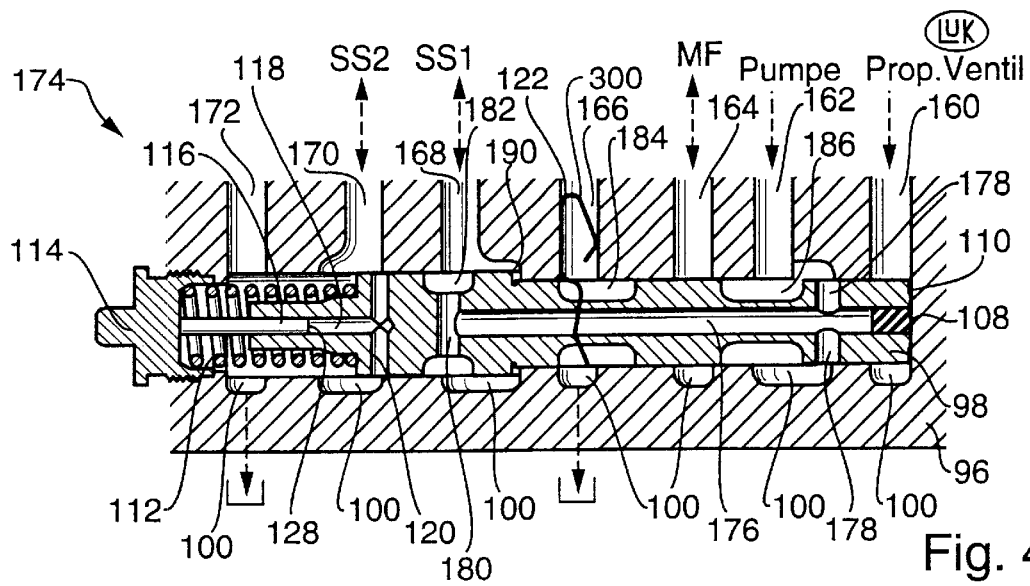
FIG. 4*a* is a schematic representation of an example of a fourth embodiment of the invention shown in a first position of the valve device.

In the position of the piston device 98 as illustrated in FIG. 4a, the openings 180 extend into a ring channel 182 of the piston device. In addition to the ring channel 182, the piston device comprises the ring channels 184 and 186.

In the condition illustrated in FIG. 4a the piston device, particularly by the force of the spring device 112, is pushed against the right-side interior end surface of the cylinder device 96. The piston device 98 is held in this position as long as the pressure existing at terminal 160 is insufficient to effect a displacement of the piston device.

In this state, the pump pressure supplied to terminal 162 reaches the terminal 168 through the radial opening 178, the second interior channel 176, the radial opening 180, and the ring channel 182, whereby the first disk set can be pressurized through a conduit (not shown in the drawing) that is connected to terminal 168.

The terminal 164 is closed off by the piston device so that it Communicates with none of the other terminals 160, 162, 166, 168, 170, 172. The terminal 166, which is connected to the oil sump, dead-ends in the ring channel 184 so that terminal 166, too, communicates with none of the other terminals 160, 162, 164, 168, 170, 172.

The terminal 166 also holds a bracket or a displacement-limiting stop by which the mobility of the piston device 98 can be or is restrained in relation to the cylinder device 96. The terminal 170 serves in particular to receive a connecting conduit to the second disk set 20, 22.

In the position of the piston device as shown in FIG. 4a, terminals 170 and 172 are connected through the space that holds the spring device 112, so that terminal 170 is essentially pressure-free.

The sequence of FIGS. 4b through 4e serves as an example for the different positions that the piston device can take in response to a control signal in the form of a pressure level introduced through terminal 160.

Figure 4B:
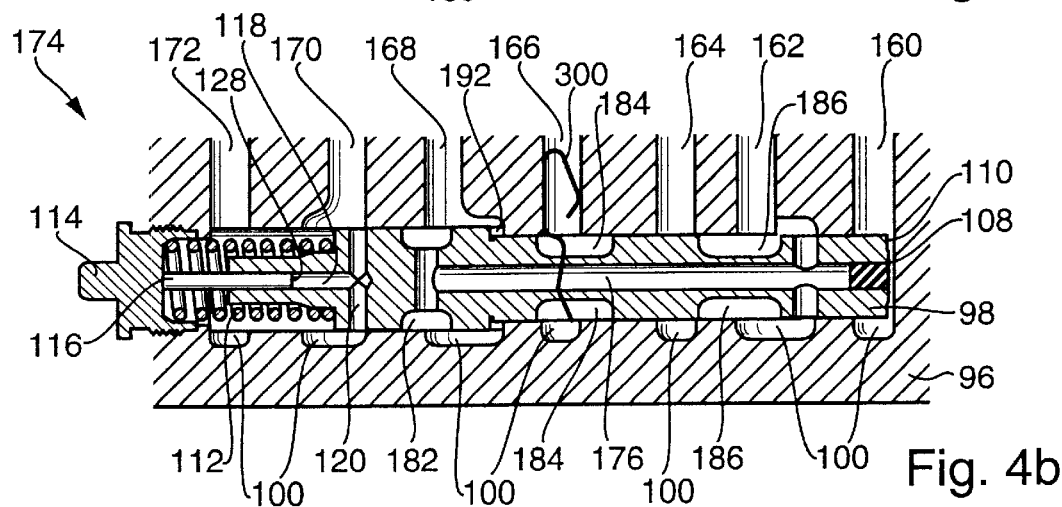
FIG. 4*b* is a schematic representation of an example of a fourth embodiment of the invention shown in a second position of the valve device.

In an exemplary way, FIG. 4b shows the first position, which is occupied after the pressure, acting first on the ring-shaped area 110 and subsequently also on the protrusion 108, has caused a leftward displacement of the piston device.

At this point, terminal 162 continues to be in communication with terminal 168. It should be noted, and this is also true for the conditions shown in FIG. 4c, that the radial step causes the pressure to act asymmetrically on the piston device 98 in the area of the chamber 192. As a result of the asymmetric pressure, there is a force acting on the piston that is essentially a function of the pressure present at the first disk set 14, 16. The latter force acts against the direction of the force of the spring 116 and in the same direction as the force that is produced by the pressure against the end surface 110 and/or the protrusion 108 of the piston device 98. Terminal 164 at this point is still blocked by the piston device 98, and so is terminal 166. Terminal 166 still dead-ends in the ring channel 184. Terminals 170 and 172 continue to be connected.

Figure 4C:
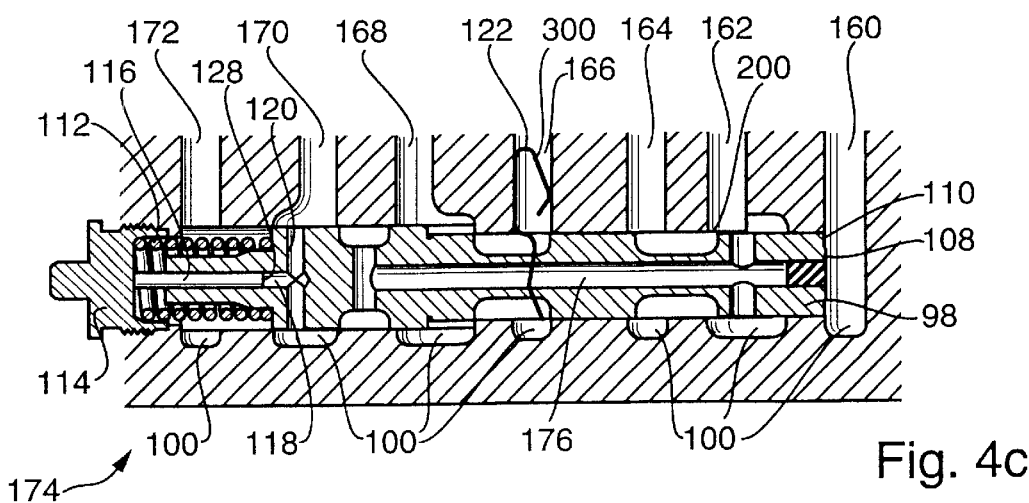
FIG. 4*c* is a schematic representation of an example of a fourth embodiment of the invention shown in a third position of the valve device.

In the position illustrated in FIG. 4c, the ring channel 182 is closed off from the outside, so that the bore hole 176 no longer provides a connection between terminal 162 and any other terminal. Rather, terminal 162 communicates with terminal 164 through the ring channel 186. Terminal 166 is at the limit (at the edge of the ring channel 184) of still being closed off by the piston device 98. Terminal 168 is not connected to any of the terminals 160, 162, 164, 166, 170, 172.

Terminal 170 leads towards the end surface 128 of the slide 116. Terminals 170 and 172 are at the limit of still being connected.

Figure 4D:
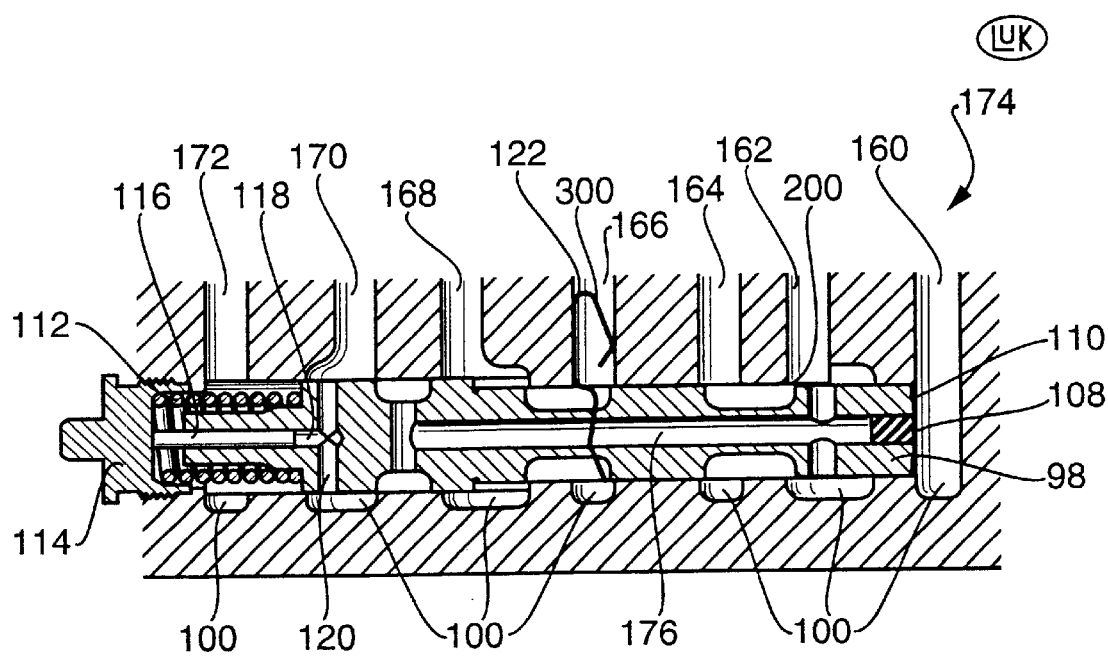
FIG. 4*d* is a schematic representation of an example of a fourth embodiment of the invention shown in a fourth position of the valve device.

FIG. 4d shows a fourth position of the valve device 174 of the example of a fourth embodiment according to the invention. As can be seen, the pressure introduced at terminal 160 continues to act on the end surface 110, 108. Terminal 162 continues to be in communication with terminal 160, but no connection remains open through the interior bore hole 176 to any of the other channels 160, 166, 168, 170, 172. The opening of the throttle 200 is relatively small in this position of the device and, accordingly, the pressure differential between terminal 162 and the torque-sensor terminal 164 is relatively large. A connection through ring channel 184 is at the point of opening up between the terminal 166 (leading to the sump) and terminal 168 (leading to the first disk set 14, 16). Terminal 170 continues to be connected through the openings 120 to the interior channel 118 and the end surface 128 of the internal slide 116. However, there is no longer a connection between terminals 170 and 172.

With the position of the valve device as shown in FIG. 4d, the disk sets 14, 16 and 20, 22, together with the chain 24, continue to be held at their positions so as to maintain their set transmission ratio.

Figure 4E:
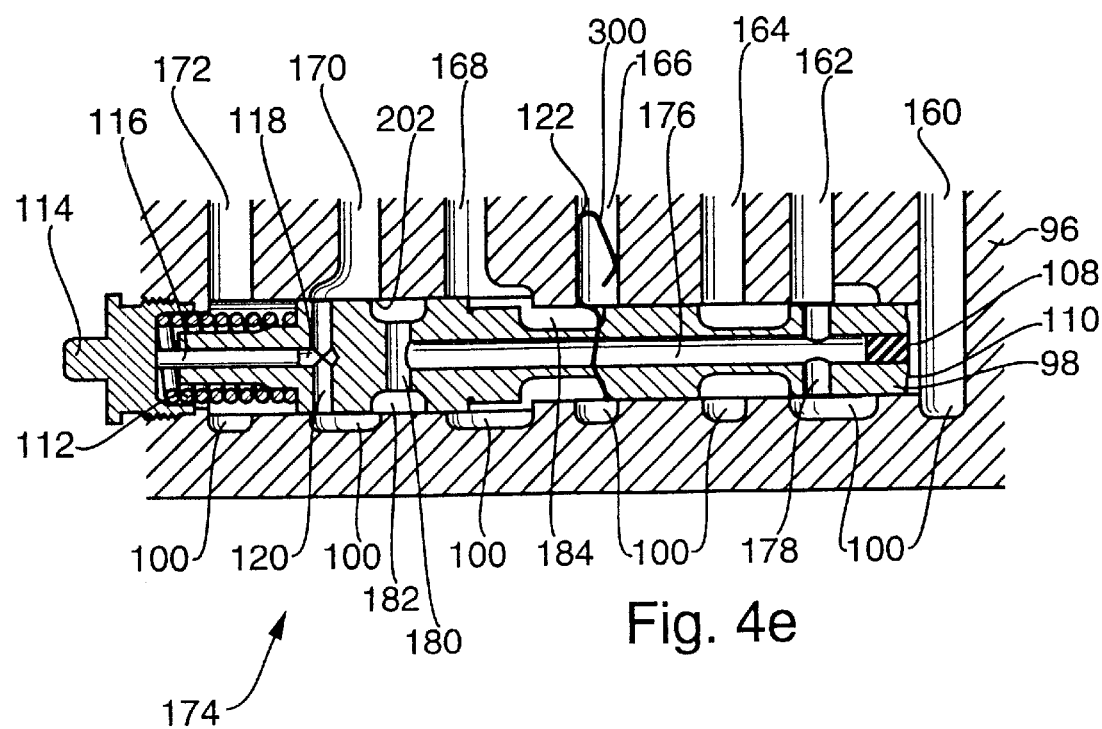
FIG. 4*e* is a schematic representation of an example of a fourth embodiment of the invention shown in a fifth position of the valve device.

FIG. 4e illustrates a position of the valve device 174, where the transmission 10 (not shown in FIG. 4e) is being shifted by pressurizing the second disk set 20, 22. This shift, too, is made by introducing to terminal 160 an appropriate amount of pressure, which acts on the axially facing end surface 108, 110 of the piston device 98. Terminal 162 communicates with terminal 170 through the radial openings 178, the second interior channel 176, the radial openings 180, and the ring channel 182. Terminal 170 receives a connecting conduit that supplies the pressure to energize the change of the second disk set 20, 22. This arrangement allows the pressure at terminal 170 to be set to a required level even if the pressure at terminal 162 is held constant. The pressure level at terminal 70 is controlled, e.g., through the throttle opening 202. The fluid flow cross-section of the throttle 202 varies depending on the axial position of the piston device 98, which allows a pressure differential of a controlled magnitude to be set between terminals 162 and 170.

Terminals 164 and 172 are essentially closed off by the piston device 98. Terminal 168 communicates with terminal 166 through the ring channel 184 so that terminal 168 is essentially pressure-free.

FIGS. 2a through 2e and 4a through 4e show a sheet-metal holder 300 that serves as a fixed limit stop for the piston device. At the same time, it facilitates adjusting of the pre-compression of the compression spring. The amount of pre-compression can be varied, e.g., by adjusting the depth of engagement of the threaded support pushing 114.

The sheet metal holder, which has an opening that is engaged by the piston device, is inserted into one of the connector terminals. Preferably, the portion of the piston device that is received by the sheet metal holder has a reduced diameter. The limit stop is formed by the contact between the sheet metal holder and the step to a larger diameter of the piston device. A more detailed description is given in the context of FIGS. 7a through 7c.

FIG. 5 shows an example of a fifth embodiment of the invention in a schematic representation. The continuously variable transmission 10 corresponds essentially to the transmission of FIGS. 1 and 3.

The control device 220, configured as a hydraulic device for changing, holding, and controlling the transmission 10, is distinguished by specific differences from the embodiments of FIGS. 1 and 3.

The piston device 222, biased by the compressive force of the spring device 112, is axially movable inside a cylinder device 224. At one of the terminals (226 in FIG. 6a) a connector conduit is received that, at least as a part of its function, establishes a connection to a proportional valve 240.

The FIGS. 6a through 6e illustrate an example of a sixth embodiment of the invention in a partially sectional view, with the valve device 250 represented in five different positions of the cylinder device 98.

Figure 6A:
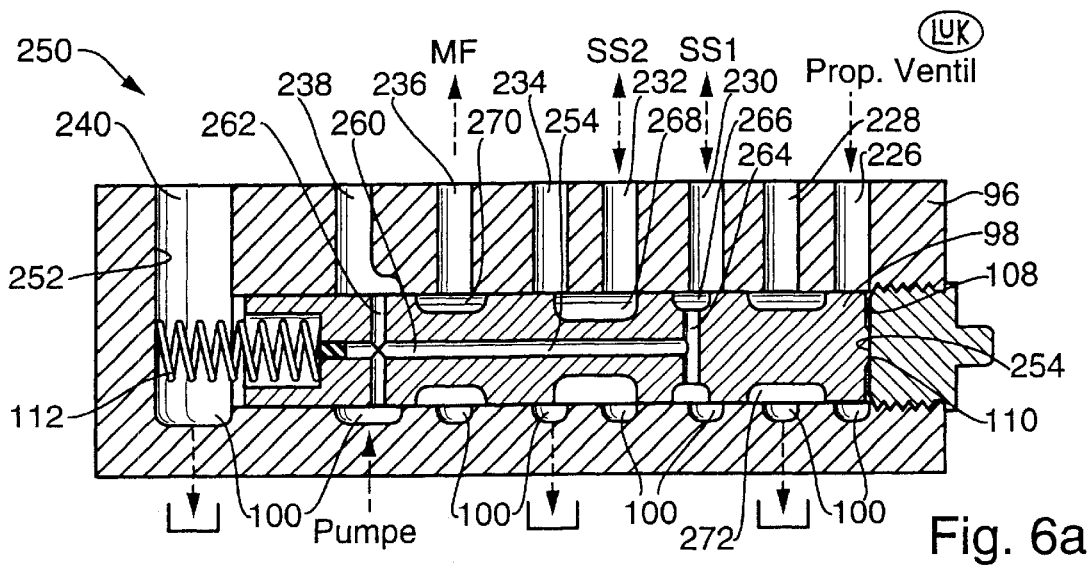
FIG. 6*a* is a schematic representation of an example of a sixth embodiment of the invention shown in a first position of the valve device.

In the state of the valve device as illustrated in FIG. 6a, the piston device 98 is pushed to its extreme end position against the wall 254 by the compressive force of the spring 112 that is held captive between the wall 252 of the cylinder device 96 on one side and the piston device 98 on the other side.

The valve device 250 has the following connector terminals along its axial direction: A terminal 226 for a connection to a proportional valve; a terminal 228 for a connection to a hydraulic sump; a terminal 230 to supply pressure to a first disk set 14, 16; a terminal 232 to supply pressure to a second disk set; a terminal 234 for a connection to a hydraulic sump; a terminal 236 for a connection to a torque sensor or, more generally, to receive a controlling input for setting the ratio of the transmission 10; a terminal 238 for a connection to a pump device; and a terminal 240 for a connection to a hydraulic sump.

The piston device 98 has a channel 260 running essentially in the axial direction inside the piston. Radially directed passages 262, 264 run, respectively, from the channel 260 to the cylindrical surface of the piston device 98 and to the ring channel 266. It should be noted that in the preferred embodiment of FIGS. 6a through 6e, the piston device comprises additional ring channels 268, 270, 272.

With the valve position as shown in FIG. 6a, the terminal 228 leading to the hydraulic sump is essentially blocked by the piston device 98. Terminal 230 (which leads to the first disk set 14, 16) is connected to terminal 238 (which leads to the pump) through the radial openings 264, 262 and the channel 260. Accordingly, in this state of the valve device, the first disk set is being pressurized. The second disk set is connected via the terminal 232 and the ring channel 268 to the essentially pressure-free terminal 234 which leads to the oil sump.

Figure 6B:
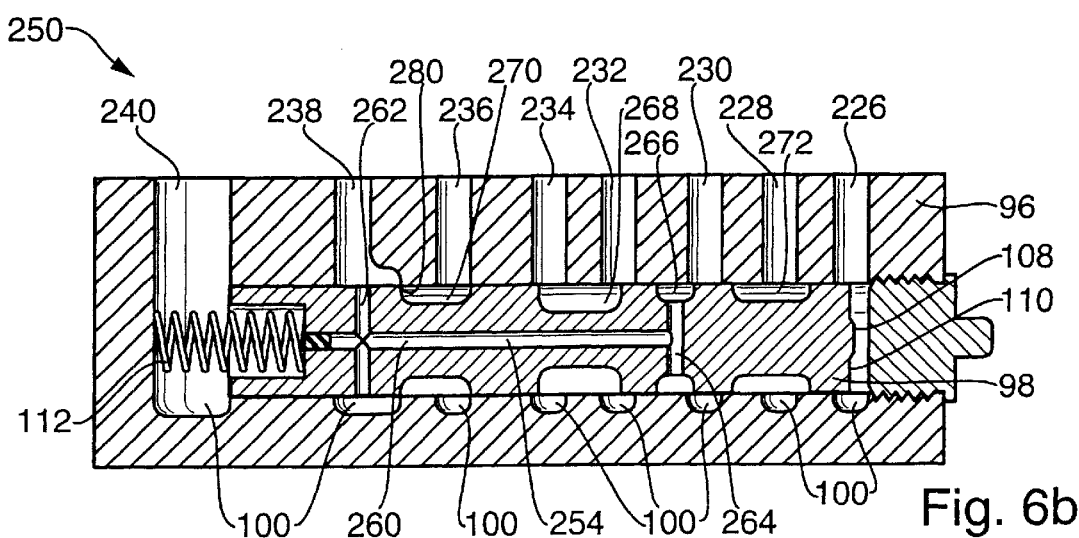
FIG. 6*b* is a schematic representation of an example of a sixth embodiment of the invention shown in a second position of the valve device.

The illustrated sixth embodiment of the invention is brought into or passes through the position as shown in FIG. 6b when pressure is introduced through terminal 226 and pushes against the end surface 108, 110 of the piston device 98. Terminal 228 (leading to the sump) is still blocked by the piston device. Terminal 230 (leading to the first disk set) is connected to terminal 238 (leading to the pump) via the radial openings 264, 262 and the passage 254. Thus, the first disk set still remains under pressure. Also, terminal 232 remains in communication with terminal 234 through the ring channel 268. A connection between terminals 236, 238 through the ring channel 270 is at the limit of remaining closed as the controlling edges 280 of the cylinder device and the piston device still have a minimal amount of contact.

Figure 6C:
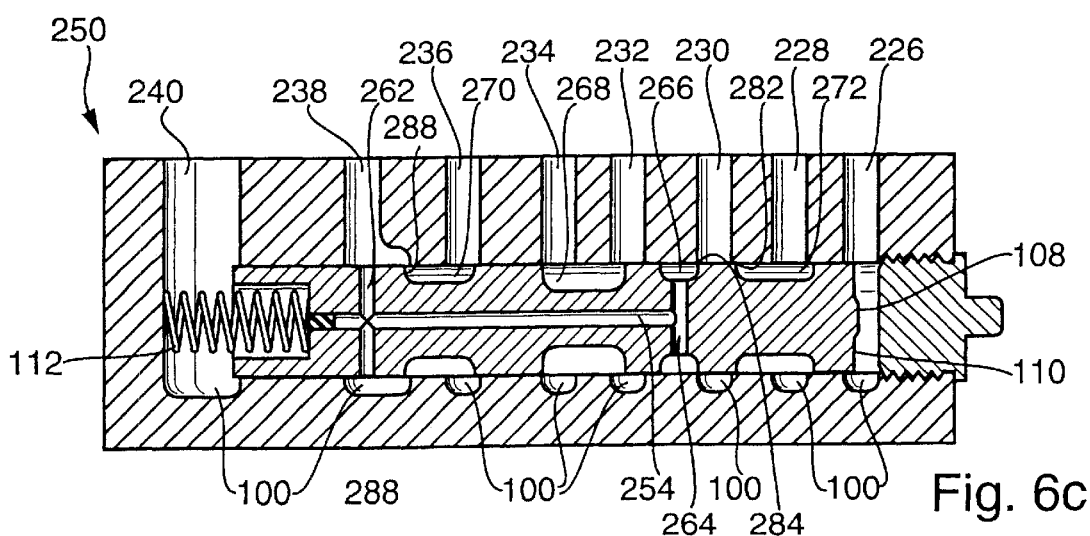
FIG. 6*c* is a schematic representation of an example of a sixth embodiment of the invention shown in a third position of the valve device.

In the state of the valve device 250 as shown in FIG. 6c, the piston device has been displaced by an additional amount as a result of the pressure at terminal 226. Terminal 228 is at the limit of its dead-end condition as the controlling edges 282 of the cylinder device and the piston device still have a minimal amount of contact, thereby blocking the connection between terminal 228 and 230. Accordingly, passage through terminal 230 is blocked by the piston device 98, because the controlling edges 284, too, are cutting off the connection from terminal 230 to any of the other terminals 226, 228, 232, 234, 236, 238. Terminal 232, which would serve otherwise to pressurize the second disk set 20, 22, is still connected to the oil sump through the ring channel 268. The additional displacement of the piston has, however, opened up a connection between terminals 236 and 238 through the ring channel 270. Thus, the torque sensor is connected to the pump. The pressure supplied to the torque sensor (which serves to maintain the transmission ratio at a set level) can be controlled, e.g., through the throttle 288. For example, the control can be a function of the position of the piston 98, given that the passage cross-section of the throttle 288 and, consequently, the pressure differential between terminals 236 and 238, depends on the axial position of the piston device 98.

Figure 6D:
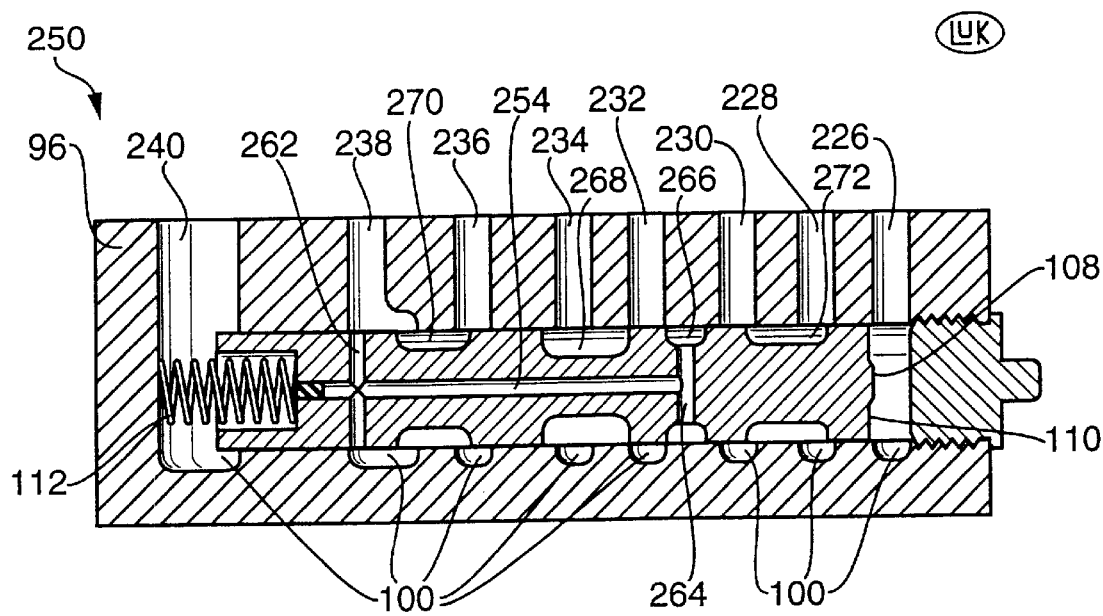
FIG. 6*d* is a schematic representation of an example of a sixth embodiment of the invention shown in a fourth position of the valve device.

With a further displacement of the piston device 98 as shown, e.g., in FIG. 6d, terminals 230 and 228 are connected through the ring channel 272. Thus, the first disk set 14, 16 is set into a pressure-free condition, i.e., at ambient pressure, by being connected to the oil sump. The ring channel 266 adjoining the radial opening 264 is closed off by the wall of the cylinder device 96.

Terminal 232 is closed off by the piston device 98, and terminal 234, likewise, is blocked by the piston device 98. A connection is established between terminals 236 and 238 through the ring channel 270. However, due to the enlarged passage cross-section, the pressure differential at the throttle 288 is smaller when the piston device is at an intermediate position.

Figure 6E:
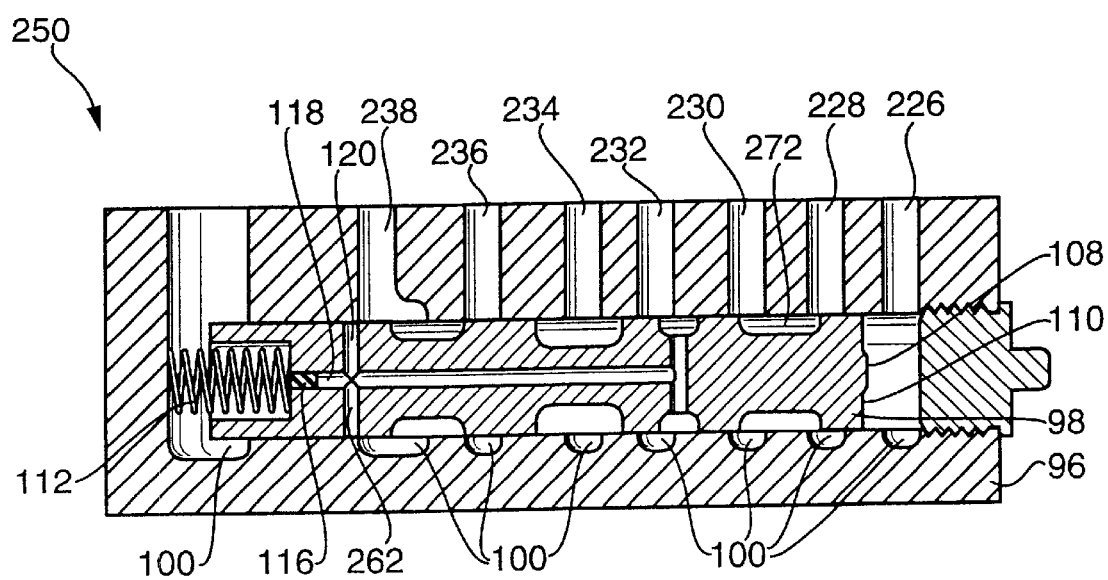
FIG. 6*e* is a schematic representation of an example of a sixth embodiment of the invention shown in a fifth position of the valve device.

When the valve device 250 is in the position illustrated in FIG. 6e, the radial opening 262 is closed off by the piston device 96. Terminal 238, likewise, is blocked by the piston device 98. The same applies to terminals 236 and 234. Also, terminal 232 is not connected with any of the remaining terminals 226, 228, 230, 234, 236, 238. Terminals 230 and 228 are connected through the ring channel 272.

Accordingly, the first disk set 14, 16 is connected to the sump.

Between the positions shown in FIGS. 6d and 6e, there is an intermediate valve position where terminal 232 (which serves to pressurize the second disk set 20, 22) is connected to the pressure supply terminal 238 through the ring channel 266, the radial opening 264, the interior channel 254, and the radial opening 262. A pressure differential between terminals 238 and 232 can be controlled through the amount of throttling action that occurs depending on the degree of piston displacement.

Figure 7C:
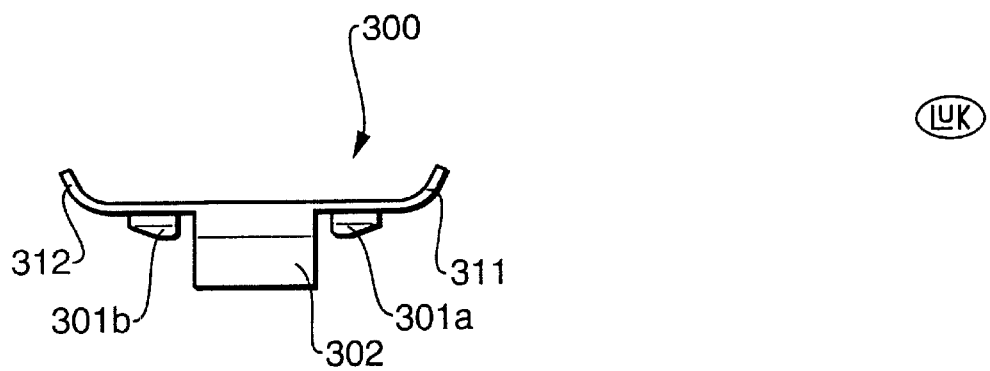
FIG. 7*c* represents a sheet metal holder as seen from another direction.
Figure 7B:
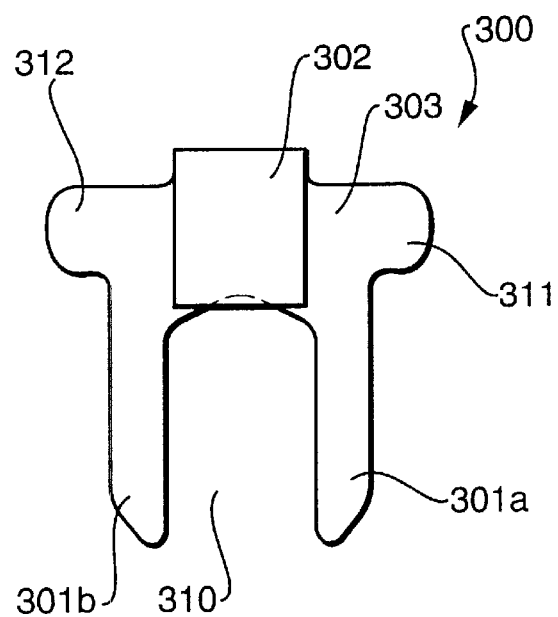
FIG. 7*b* represents a sheet metal holder as seen from one direction.
Figure 7A:
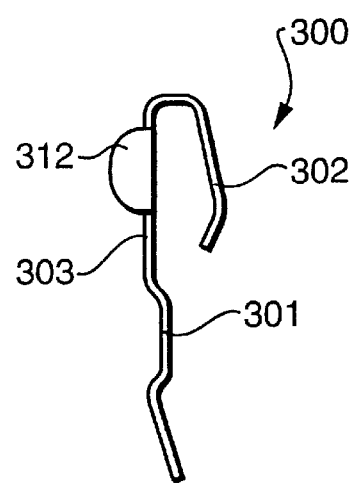
FIG. 7*a* represents a cross-sectional view of a sheet-metal holder.

The FIGS. 7a through 7c illustrate a sheet-metal holder as referred to in the context of FIGS. 2a through 2e and 4a through 4e. As seen in the cross-sectional view of FIG. 7a, the sheet-metal holder 300 has two legs 301 and 302 of different length. Leg 301 is bifurcated into the two prongs 301a and 301b with a free space or opening 310 between them. The opening 310 serves to receive a narrow-diameter portion of the cylinder device, so that an adjacent cylinder portion of larger diameter will run against the prongs.

Leg 302 is configured as a spring opposite leg 301, so that legs 301 and 302 together form a U-shape. The upper part of the sheet metal holder with the body portion 303 and the leg 302 can thus be held spring-tight in one of the channel openings of the cylinder device.

The sheet-metal holder 300 has lateral arms 311 and 312 for a form-tight fit and thus a more secure positioning of the sheet-metal holder in the channel opening. This also prevents or at least reduces the likelihood of inserting the sheet-metal holder incorrectly in the assembly process.

The name "sheet-metal holder" is meant to indicate a preference for making the part of sheet metal. However, it could also be made out of a full body of material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle with at least one hydraulic device for controlling a transmission ratio change and for holding a set transmission ratio at a fixed level, the hydraulic device comprising at least one valve device with at least one connector terminal for controlling a transmission ratio change and at least one connector terminal for holding a set transmission ratio at a fixed level, wherein the at least one valve device has at least one channel arranged inside the interior of the piston and running at least partially in an axial direction.

2. The motor vehicle according to claim 1, including at least one endless flexible torque-transmitting device for transmitting torque between two pairs of conical disks of the transmission, wherein the at least one connector terminal at least part of the time supplies a pressure for holding the torque-transmitting device and the at least one connector terminal at least part of the time supplies a pressure for changing the transmission.

3. The motor vehicle according to claim 1, wherein the valve device is in a serial configuration essentially adjoining the transmission and comprising less than 12 connector terminals, where through corresponding valve positions of the valve device, a transmission ration can be changed from an existing level as well as maintained at an existing level.

4. The motor vehicle according to claim 1, wherein a hydraulic pressure applied for changing the transmission ratio is at least part of the time controlled by a throttle valve, the latter serving to assure that the pressure is sufficient for changing the transmission ratio.

5. The motor vehicle according to claim 1, wherein the at least one valve device includes at least one piston device and one cylinder device, wherein the cylinder device has an uninterrupted interior space in the axial direction so that all connector terminals of the valve device run into one and the same interior cylinder space.

6. The motor vehicle according to claim 1, wherein the at least one valve device includes at least one piston device and one cylinder device in which the piston device has fewer than three pistons that are movable in relation to each other.

7. The motor vehicle according to claim 1, wherein the at least one valve device includes at least one piston device and one cylinder device in which the piston device has one and only one piston.

8. The motor vehicle according to claim 1, wherein the at least one valve device is a linear displacement valve device.

9. The motor vehicle according to claim 1, wherein at least one of the channels can receive hydraulic fluid.

10. The motor vehicle according to claim 1, wherein at least one of the channels can receive an internal slide.

11. The motor vehicle according to claim 10, wherein the internal slide is firmly coupled to the cylinder.

12. The motor vehicle according to claim 1, wherein at least one opening extends radially from the channel to the outside.

13. The motor vehicle according to claim 1, wherein at least two openings extend radially from the channel at least partway towards an outer surface of the piston, said openings being arranged at different axial positions in relation to each other.

14. The motor vehicle according to claim 1, wherein the valve device has at least one connector terminal for a connection to at least one pump.

15. The motor vehicle according to claim 1, wherein the valve device has at least one connector terminal for a conduit that serves to provide hydraulic pressure to generate a contact pressure in at least one pair of conical disks with an endless torque-transmitting device.

16. The motor vehicle according to claim 1, wherein the valve device has at least one connector terminal for a connecting conduit through which at least part of the time an energizing pressure can be generated in at least a first pair of conical disks of the transmission.

17. The motor vehicle according to claim 1, wherein the valve device has at least one connector terminal for a connecting conduit through which at least part of the time an energizing pressure can be generated in at least a second pair of conical disks of the transmission.

18. The motor vehicle according to claim 1, wherein the hydraulic device comprises at least one first hydraulic subset arrangement connected to at least one connector terminal for a connecting conduit through which at least part of the time a contact pressure can be generated in at least one pair of conical disks of the transmission, and wherein the hydraulic device further comprises at least one second hydraulic subset arrangement connected to at least one connector terminal for a connecting conduit through which an energizing pressure can be generated for changing a transmission ratio, the first and second hydraulic subset arrangements cooperating and being configured so that a) a change-energizing pressure is superimposed on the contact pressure and b) a change of the transmission ratio can be generated by varying the change-energizing pressure, whereby as a result of this arrangement, the level of the energizing pressure can be kept low.

19. The motor vehicle according to claim 1, wherein the valve device comprises connector terminals and at least one piston device as well as at least one cylinder device.

20. The motor vehicle according to claim 19, wherein the piston device is pre-tensioned by a spring force in a position where the connector terminals are pressure-free.

21. The motor vehicle according to claim 19, wherein the piston device is designed to be acted on by a pressure on at least one axially facing surface.

22. The motor vehicle according to claim 19, wherein the piston device comprises portions that extend at least partially in a radial direction and have connections to one and the same connector terminal, and wherein further an axially directed pressure load on the radially extending portions is asymmetric.

23. The motor vehicle according to claim 19, wherein the piston device is pre-tensioned in at least one position by a spring force.

24. The motor vehicle according to claim 23, wherein the piston device is at least partially configured as a hollow shaft for receiving an internal slide that is fixed in relation to a wall of the cylinder device and wherein further the piston device has at least one part where a chamber is formed with wall portions facing in respectively different directions and configured so that the sum of the axial projections of the wall portions of the chamber that face in one axial direction is different from the sum of the axial projections of the wall portions of the chamber that face in an opposite axial direction, the wall portions being connected to the same connector terminal so that as a result, after an energizing pressure at a connector terminal has been changed, a state of equilibrium establishes itself between the spring force, the force caused by the difference in the axial projections of the wall portions, the force generated by a controlling pressure, and the force acting on the internal slide.

25. The motor vehicle according to claim 19, comprising at least one limit stop to restrict piston movement of the cylinder device.

26. The motor vehicle according to claim 25, wherein the at least one limit stop extends at least partially from a cylinder wall at least partially into an interior space of the cylinder.

27. The motor vehicle according to claim 25, wherein the at least one limit stop extends axially between end points of the piston device and comprises at least one element extending from a cylinder wall in the direction towards the piston device.

28. The motor vehicle according to claim 19, wherein the valve device can perform at least one of the two functions of, respectively:
 a) opening a connection between a connector terminal from a pressure source and a connector terminal to an energizing line for changing an existing transmission ratio to a greater transmission ratios and
 b) opening a connection between a connector terminal from a pressure source and a connector terminal to an energizing line for changing an existing transmission ratio to a smaller transmission ratio,
and wherein further the hydraulic fluid that is movable between a connector terminal from a pressure source and a connector terminal to an energizing line applies pressure to the piston device so that a resultant force acts on the piston device in a pressure range between pressures existing at said connector terminals.

29. The motor vehicle according to claim 28, wherein the resultant force is a linear function of the pressure applied to the piston device.

30. The motor vehicle according to claim 28, wherein respective pressure levels at the connector terminal from a pressure source and the connector terminal to an energizing line are different from each other and the resultant force is determined by one of the pressure levels at said connector terminals.

31. The motor vehicle according to claim 28, comprising between the connector terminal from a pressure source and the connector terminal to an energizing line a throttle valve device with a valve opening of variable cross-section.

32. The motor vehicle according to claim 31, wherein the variable cross-section depends on the resultant force.

33. The motor vehicle according to claim 31, wherein the variable cross-section increases as an effect of at least a part of the resultant force when the latter exceeds a preset resultant force level.

34. The motor vehicle according to claim 31, wherein the variable cross-section increases as an effect of at least a part of the resultant force when the latter is below a preset resultant force level.

35. The motor vehicle according to claim 31, wherein the variable cross-section decreases as an effect of at least a part of the resultant force when the latter exceeds a preset resultant force level.

36. The motor vehicle according to claim 31, wherein the variable cross-section decreases as an effect of at least a part of the resultant force when the latter is below a preset resultant force level.

37. The motor vehicle according to claim 1, wherein the continuously variable transmission is a conical-disk transmission with an endless flexible torque-transmitting device.

38. The motor vehicle according to claim 37, wherein the continuously variable transmission comprises at least two pairs of conical disks, one of the pairs being rotationally coupled to an input side and the other of the pairs being rotationally coupled to an output side of the continuously variable transmission.

39. The motor vehicle according to claim 38, wherein the torque-transmitting device is a chain-belt that transmits a torque between the pairs of conical disks.

40. The motor vehicle according to claim 38, wherein each of the pairs of conical disks comprises at least an axially movable and an axially fixed disk.

41. The motor vehicle according to claim 38, wherein at least one of the pairs of conical disks comprises an axially movable and an axially fixed disk.

42. The motor vehicle according to claim 41, wherein at least one of the pairs of conical disks can be axially tensioned by an actuating member.

43. The motor vehicle according to claim 42, wherein the endless flexible torque-transmitting device is arranged between the conical disks so as to be tensioned by the conical disks.

44. The motor vehicle according to claim 42, wherein the actuating member is configured as a piston-cylinder device.

45. The motor vehicle according to claim 42, wherein an existing position of the disk pair and a transmission ratio associated with said position are changed by the application of an axial force against at least one movable disk, said axial force being generated by the pressure of a hydraulic fluid applied against a surface of the movable disk.

46. The motor vehicle according to claim 42, wherein the movable disk comprises at least one chamber for holding a hydraulic fluid.

47. The motor vehicle according to claim 46, wherein the movable disk comprises in a parallel-action arrangement at least two chambers for holding a hydraulic fluid.

48. The motor vehicle according to claim 46, wherein the movable disk comprises in a serial-action arrangement at least two chambers for holding a hydraulic fluid.

49. The motor vehicle according to claim 1, wherein the continuously variable transmission has a transmission ratio that can be at least in part be changed hydraulically.

50. The motor vehicle according to claim 49, wherein the transmission ratio is changed by means of at least one hydraulic chamber.

51. A motor vehicle with at least one continuously variable transmission and at least one hydraulic device, the latter comprising at least one hydraulic pump and at least one valve device for changing and maintaining a transmission ratio, wherein the hydraulic valve device functions in accordance with a dual-piston principle, wherein further a hydraulic control device for controlling an axially movable conical disk of the transmission comprises at least two parallel-operating hydraulic chambers that can at least in part be subjected to a pressure, and wherein, in addition, all hydraulic conduits supplying pressure to the chambers run into one and the same valve device.

52. A motor vehicle with at least one continuously variable transmission, at least one endless flexible torque-transmitting device for transmitting torque between two pairs of conical disks of the transmission, and at least one hydraulic device, the latter comprising a valve device with at least two connector terminals, wherein each of at least two connector terminals of the valve device receives a hydraulic conduit for supplying pressure to the transmission and wherein further said hydraulic conduits are introduced into pressure chambers such that the pressures in at least two chambers are at least in part additive and the sum of the combined pressures is at least in part applied to the transmission.

53. A motor vehicle with at least one continuously variable transmission, at least one hydraulic device for controlling the transmission, and at least one valve device that belongs to the hydraulic device and comprises a piston device as well as a cylinder device; wherein at least part of the time at least one chamber for receiving a hydraulic medium is formed by the piston device and the cylinder device, the medium being under an essentially uniform pressure within the chamber; wherein further the chamber is delimited in the direction of a first piston end by a first pressure-bearing surface and in the direction of a second piston end by a second pressure-bearing surface, the first and second pressure-bearing surfaces have respective effective areas represented by projections of the first and second pressure-bearing surfaces onto a plane that is perpendicular to the piston axis; and wherein furthermore the effective area of the first pressure-bearing surface is different from the effective area of the second pressure-bearing surface.

54. A motor vehicle with at least one continuously variable transmission, wherein the transmission can be changed by means of a hydraulic device that includes a valve device for effecting the transmission ratio change, the valve device comprising a piston device and a cylinder device with chambers being formed at least part of the time, the chambers being delimited by wall portions that belong at least in part to the cylinder device and at least in part to the piston device in an arrangement where the sum of the axial projections of the wall portions that belong to the piston device and delimit the chamber in the direction of a first piston end is greater than the sum of the axial projections of the wall portions that belong to the piston device and delimit the chamber in the direction of a second piston end so that, when the chamber is filled with hydraulic fluid, there is a resultant force of a magnitude other than zero acting on the piston device within the chamber.

55. The motor vehicle according to claim 54, wherein the chambers are associated with pairs of conical disks and at least one chamber is provided for each pair of disks.

56. A motor vehicle with at least one continuously variable transmission and at least one hydraulic device for controlling a transmission ratio change and for holding a set transmission ratio at a fixed level, the hydraulic device comprising a valve device with at least one connector terminal for holding a set transmission ratio at a fixed level, wherein the valve device has at least one connector terminal for a connection to at least one torque sensor.

57. A motor vehicle with at least one continuously variable transmission and at least one hydraulic device for controlling a transmission ratio change and for holding a set transmission ratio at a fixed level, the hydraulic device comprising a valve device with at least one connector terminal for holding a set transmission ratio at a fixed level, wherein the valve device has at least one connector terminal for a conduit arriving from a proportional valve.

58. A motor vehicle with at least one continuously variable transmission and at least one hydraulic device for controlling a transmission ratio change and for holding a set transmission ratio at a fixed level, the hydraulic device comprising a valve device with at least one connector terminal for holding a set transmission ratio at a fixed level, wherein the valve device serves to shift between a first function, which is to hold the transmission with pairs of conical disks at a set transmission ratio, and a second function, which is to bring the transmission to a set ratio, the valve device comprising fewer than 12 connector terminals.

59. The motor vehicle according to claim 58, wherein all hydraulic conduits serving the first function and all hydraulic conduits serving the second function run into one and the same valve device.

60. The motor vehicle according to claim 59, wherein a connecting conduit between the transmission and the valve device for a hydraulic fluid serving the first function is free of valves that have variable settings.

61. A motor vehicle with at least one continuously variable transmission and at least one hydraulic device for controlling a transmission ratio change and for holding a set transmission ratio at a fixed level, the hydraulic device comprising a valve device with at least one connector terminal for holding a set transmission ratio at a fixed level, wherein a pressure of a hydraulic fluid flowing through the valve device is throttled at least part of the time so that an energizing pressure effecting a ratio change of the transmission has at least part of the time a pressure level that results from the throttling of the valve device.

62. The motor vehicle according to claim 61, wherein the pressure of the hydraulic fluid flowing from a pressure source into the valve device for generating the energizing pressure is throttled when a preset stream of hydraulic fluid arriving at the valve device has a pressure that exceeds a preset pressure level.

63. The motor vehicle according to claim 61, wherein the energizing pressure can be increased without an increase in displacement volume of a pump supplying the pressure of the hydraulic fluid.

64. A motor vehicle with at least one continuously variable transmission and at least one hydraulic device for controlling a transmission ratio change and for holding a set transmission ratio at a fixed level, the hydraulic device comprising a valve device with at least one connector terminal for holding a set transmission ratio at a fixed level, wherein a torque-sensor device with a torque-sensor chamber is arranged in a torque-flow path serially upstream of the transmission and wherein further a connecting conduit between the valve device and an entry point into the torque sensor is free of valves that have variable settings.

65. A motor vehicle with at least one continuously variable transmission and at least one hydraulic device for controlling a transmission ratio change and for holding a set transmission ratio at a fixed level, the hydraulic device comprising a valve device with at least one connector terminal for holding a set transmission ratio at a fixed level, wherein the valve device comprises a connector terminal for a hydraulic conduit designed to carry a hydraulic conduit designed to carry a hydraulic that generates a settable controlling pressure for setting at least one of a group of parameters that consists of target values for valve positions and target values for energizing pressures.

66. A motor vehicle with at least one continuously variable transmission, at least one torque sensor and at least one hydraulic device for controlling a transmission ratio change and for holding a set transmission ratio at a fixed level, the hydraulic device comprising a valve device with at least one connector terminal for holding a set transmission ratio at a fixed level.

67. The motor vehicle according to claim 66, wherein the torque sensor is a hydro-mechanical torque sensor.

68. The motor vehicle according to claim 67, wherein the torque sensor converts a torque of an input shaft into a pressure that acts against an axially movable disk of the continuously variable transmission.

69. The motor vehicle according to claim 68, wherein the torque sensor serves to provide a position-maintaining pressure to at least one conical disk of the continuously variable transmission.

70. The motor vehicle according to claim 68, wherein the torque sensor comprises at least a first cam disk that is constrained to a fixed axial position while being rotatable within a limited angular range.

71. The motor vehicle according to claim 70, wherein the torque sensor additionally comprises at least a second cam disk, the second being axially movable.

72. The motor vehicle according to claim 71, wherein at least one of the first cam disk and the second cam disk has at least one tapered ramp.

73. The motor vehicle according to claim 72, wherein at least one space-holding body is arranged inside the torque sensor in a ramp area between the first and second cam disks.

74. The motor vehicle according to claim 73, wherein the space-holding body has a shape that enables it to roll in at least one direction.

75. The motor vehicle according to claim 67, comprising at least one drainage channel that is connectable to a chamber of the torque sensor.

76. The motor vehicle according to claim 75, comprising a controllable throttle valve between the drainage channel and the chamber of the torque sensor.

77. The motor vehicle according to claim 76, wherein the throttle valve has an effective cross-section that depends on at least one of the group of parameters that consists of a torque acting on the torque sensor and of a pressure in the chamber of the torque sensor.

* * * * *